(12) United States Patent
Zhang et al.

(10) Patent No.: US 9,258,562 B2
(45) Date of Patent: Feb. 9, 2016

(54) DERIVATION OF DEPTH MAP ESTIMATE

(71) Applicant: QUALCOMM Incorporated, San Diego, CA (US)

(72) Inventors: Li Zhang, San Diego, CA (US); Ying Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 465 days.

(21) Appl. No.: 13/772,917

(22) Filed: Feb. 21, 2013

(65) Prior Publication Data

US 2013/0335522 A1    Dec. 19, 2013

Related U.S. Application Data

(60) Provisional application No. 61/659,290, filed on Jun. 13, 2012.

(51) Int. Cl.
| | |
|---|---|
| *H04N 13/00* | (2006.01) |
| *H04N 19/51* | (2014.01) |
| *H04N 19/597* | (2014.01) |
| *H04N 19/52* | (2014.01) |
| *H04N 19/46* | (2014.01) |

(52) U.S. Cl.
CPC ......... *H04N 19/00696* (2013.01); *H04N 19/52* (2014.11); *H04N 19/597* (2014.11); *H04N 19/46* (2014.11)

(58) Field of Classification Search
CPC .............. H04N 7/26; H04N 7/32; H04N 7/36
USPC ............................................................ 348/43
See application file for complete search history.

(56) References Cited

U.S. PATENT DOCUMENTS

| | | | |
|---|---|---|---|
| 7,085,409 | B2 | 8/2006 | Sawhney et al. |
| 7,489,342 | B2 | 2/2009 | Xin et al. |
| 2010/0238160 | A1 | 9/2010 | Yea et al. |
| 2012/0044322 | A1 | 2/2012 | Tian et al. |
| 2012/0229602 | A1 | 9/2012 | Chen et al. |
| 2014/0009574 | A1* | 1/2014 | Hannuksela et al. ........... 348/42 |
| 2014/0341292 | A1* | 11/2014 | Schwarz et al. ......... 375/240.16 |

OTHER PUBLICATIONS

International Preliminary Report on Patentability—PCT/US2013/040582, The International Bureau of WIPO—Geneva, Switzerland, Sep. 23, 2014, 13 pp.

(Continued)

*Primary Examiner* — William Tran
(74) *Attorney, Agent, or Firm* — Shumaker & Sieffert, P.A.

(57) ABSTRACT

In some example techniques for generating and updating depth map estimates used for inter-view motion prediction and/or inter-view residual prediction for coding multiview video data, each of a plurality of dependent views is associated with a dependent depth view estimate, which may be generated or updated based on coding of the texture data of the dependent view relative to a base view. In such examples, each of the dependent depth map estimates may be warped to the base view to produce a respective one of a plurality of base depth map estimates. Each dependent depth map estimate and the respective base depth map estimate for a depth map estimate pair associated with the respective one of the plurality of dependent views.

53 Claims, 11 Drawing Sheets

(56) References Cited

OTHER PUBLICATIONS

Takahashi et al., "3D-CE5.h Related Results on Reduction of Depth Map Estimation by Sony," MPEG Meeting; Geneva; (Motion Picture Expert Group or ISO/IEC JTC1/SC29/WG11),No. m24989, May 2012, 5 pp.

Xiu et al., "An improved depth map estimation algorithm for view synthesis and multiview video coding," Visual Communications and Image Processing; Huang Shan, An Hui, China, Jul. 11, 2010, 9 pp.

Second Written Opinion of International Application No. PCT/US2013/040582, mailed May 27, 2014, 7 pp.

ITU-T H.265, Series H: Audiovisual and Multimedia Systems, Infrastructure of audiovisual services—Coding of moving video, Advanced video coding for generic audiovisual services, The International Telecommunication Union, Oct. 2014, 540 pp.

ITU-T H.265, Series H: Audiovisual and Multimedia Systems, Infrastructure of audiovisual services—Coding of moving video, High efficiency video coding, The International Telecommunication Union, Apr. 2013, 317 pp.

Anonymous: "Test Model under Consideration for HEVC based 3D video coding", 99. MPEG Meeting; San Jose, CA; (Motion Picture Expert Group or ISO/IEC JTC1/SC29/WG11), No. N12559, Feb. 11, 2012, XP030019033. 45 pp.

Bartnik, et al., "HEVC Extension for Multiview Video Coding and Multiview Video plus Depth Coding", ITU-Telecommunications Standardization Sector Study Group 16 Question 6 Video Coding Experts Group (VCEG), 44nd Meeting: San Jose, CA, USA, Feb. 3-10, 2012, Document VCEG-AR13, 42 pages.

Bross, et al., High Efficiency Video Coding (HEVC) text specification draft 10 (for FDIS & Last Call), Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, Document JCTVC-L1003_v34, 310 pages.

Bross, et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, pp. 259.

Bross, et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, JCTVC-I1003_d2, 290 pages.

Bross, et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, 261 pages.

Bross, et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, CN, Oct. 10-19, 2012, JCTVC-K1003_v7, 290 pages.

Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.

Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.

Ekmekcioglu E., et al., "Content Adaptive Enhancement of Multi-View Depth Maps for Free Viewpoint Video", IEEE Journal of Selected Topics in Signal Processing, IEEE, US, vol. 5, No. 2, Apr. 1, 2011, pp. 352-361, XP011350690, ISSN: 1932-4553, 10 pages.

International Search Report and Written Opinion—PCT/US2013/040582—ISA/EPO—Jul 29, 2013, 14 pages.

ITU-T H.264, Series H: Audiovisual and Multimedia Systems, Infrastructure of audiovisual services—Coding of moving video, Advanced video coding for generic audiovisual services, Mar. 2010, 674 pages.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pages.

Schwarz H., et al., "Description of 3D Video Coding Technology Proposal by Fraunhofer HHI (HEVC compatible, configuration A)", 98. MPEG Meeting; Nov. 28, 2011-Feb. 12, 2011; Geneva; (Motion Picture Expert Group or ISO/IEC JTC1/SC29/WG11), No. m22570, Nov. 22, 2011, XP030051133, 46 pages.

Schwarz H., et al., "Test Model under Consideration for HEVC based 3D video coding v3.0", MPEG Meeting;. Apr. 30, 2012-Apr. 5, 2012; Geneva, CH; (Motion Picture Expert Group or ISO/IEC JTC1/SC29/WG11), No. N12744, 46 pages.

Schwarz, et al., "Test Model under Consideration for HEVC based 3D video coding," ISO/IEC JTC1/SC29/WG11, MPEG2011/N12559, Coding of Moving Pictures and Audio, Feb. 2012, 44 pages.

Wiegand, T., et al., "WD2: Working Draft 2 of High-Efficiency Video Coding", Jan. 28, 2011, No. JCTVC-D503, Jan. 28, 2011, XP002679642, Retrieved from the Internet: URL: http://wftp3.itu.int/av-arch/jctvc-site/2011_01_D_Daegu/ [retrieved on Jul. 11, 2012], 153 pages.

Wiegand, T., et al., "WD3: Working Draft 3 of High-Efficiency Video Coding," Document JCTVC-E603, 5th Meeting: Geneva, CH, Mar. 16-23, 2011, 193 pages.

Wiegand, T., et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010, 137 pages.

Schwarz et al., "3D-HEVC-CE3 results on inter-view motion parameter prediction by HHI," MPEG Meeting—ISO/IEC JTC1/SC29/WG11, Doc. MPEG12/M23698, San Jose, USA, Feb. 2012, 10 pages.

Schwarz et al., "Description of 3D Video Technology Proposal by Fraunhofer HHI (HEVC compatible; configuration B)," MPEG Meeting—ISO/IEC JTC1/SC29/WG11, Doc. MPEG2011/M22571, Geneva, Switzerland, Nov. 2011, 47 pages.

* cited by examiner

DERIVATION OF DEPTH MAP ESTIMATE

This application claims the benefit of U.S. Provisional Application No. 61/659,290, filed Jun. 13, 2012, the entire content of which is hereby incorporated by reference.

TECHNICAL FIELD

This disclosure relates to video coding and, more particularly, derivation of depth maps for multiview video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal or view (inter-picture) prediction to reduce or remove redundancy inherent in video sequences. For block-based video coding, a video slice (e.g., a picture or a portion of a picture) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for inter-view motion prediction and/or inter-view residual prediction for multi-view video coding. More particularly, this disclosure describes techniques for generating and updating depth map estimates used for inter-view motion prediction and/or inter-view residual prediction. In some examples, each of a plurality of dependent views is associated with a dependent depth view estimate, which may be generated or updated based on coding of the texture data of the dependent view relative to a base view. In such examples, each of the dependent depth map estimates may be warped to the base view to produce a respective one of a plurality of base depth map estimates. Each dependent depth map estimate and the respective base depth map estimate for a depth map estimate pair associated with the respective one of the plurality of dependent views.

In some examples, each of the base depth map estimates of the depth map estimate pairs are updated after the decoding of the non-anchor pictures in the common view. The updated base depth map estimates may be warped to the respective dependent views to produce updated dependent depth map estimates. In some examples, for anchor pictures in dependent views, inter-view motion prediction may be disabled, while for non-anchor pictures in dependent views, inter-view motion prediction is enabled.

The inter-view motion prediction and/or inter-view residual prediction for a dependent view may be based upon its updated dependent depth map estimate. The techniques described herein may facilitate independent decoding of the dependent views by avoiding dependencies between depth map estimates of different dependent views. For example, a depth map estimate used for inter-view motion prediction and/or inter-view residual prediction of one dependent view will not depend upon warping a depth map estimate of another dependent view. Accordingly, bitstream extraction functionality for various views available in coded multiview video data may be improved.

In one example, a method of coding video data, the video data comprising at least one base view and a plurality of dependent views, wherein the plurality of dependent views depend on the base view, comprises, for each of the dependent views, coding texture data for the dependent view for an access unit using disparity motion information for the dependent view relative to texture data for the base view for the access unit. The method further comprises, for each of the dependent views, generating a dependent depth map estimate for the access unit based on the disparity motion information for the dependent view, and warping each of the dependent depth map estimates to the base view to produce a respective one of a plurality of base depth map estimates for the access unit. Each of the dependent depth map estimates and the respective base depth map estimates form a respective one of a plurality of depth map estimate pairs for the access unit and associated with a respective one of the plurality dependent views.

In another example, a device comprises a video coder for coding video data, the video data comprising at least one base view and a plurality of dependent views, wherein the plurality of dependent views depend on the base view. The video coder is configured to for each of the dependent views, code texture data for the dependent view for an access unit using disparity motion information for the dependent view relative to texture data for the base view for the access unit and, for each of the dependent views, generate a dependent depth map estimate for the access unit based on the disparity motion information for the dependent view. The video coder is further configured to warp each of the dependent depth map estimates to the base view to produce a respective one of a plurality of base depth map estimates for the access unit. Each of the dependent depth map estimates and the respective base depth map estimates form a respective one of a plurality of depth map estimate pairs for the access unit and associated with a respective one of the plurality dependent views.

In another example, a device for coding video data, the video data comprising at least one base view and a plurality of dependent views, wherein the plurality of dependent views depend on the base view, comprises means for, for each of the dependent views, coding texture data for the dependent view for an access unit using disparity motion information for the dependent view relative to texture data for the base view for the access unit. The device further comprises means for, for each of the dependent views, generating a dependent depth map estimate for the access unit based on the disparity motion information for the dependent view, and means for warping each of the dependent depth map estimates to the base view to produce a respective one of a plurality of base depth map estimates for the access unit. Each of the dependent depth map estimates and the respective base depth map estimates form a respective one of a plurality of depth map estimate pairs for the access unit and associated with a respective one of the plurality dependent views.

In another example, a computer-readable storage medium has instructions stored thereon that, when executed by one or more processors of a video coder configured to code video data comprising at least one base view and a plurality of dependent views, wherein the plurality of dependent views depend on the base view, cause the video coder to, for each of the dependent views, code texture data for the dependent view for an access unit using disparity motion information for the dependent view relative to texture data for the base view for the access unit. The instructions further cause the video coder to, for each of the dependent views, generate a dependent depth map estimate for the access unit based on the disparity motion information for the dependent view, and warp each of the dependent depth map estimates to the base view to produce a respective one of a plurality of base depth map estimates for the access unit. Each of the dependent depth map estimates and the respective base depth map estimates form a respective one of a plurality of depth map estimate pairs for the access unit and associated with a respective one of the plurality dependent views.

The details of one or more examples are set forth in the accompanying drawings and the description below. Other features, objects, and advantages will be apparent from the description and drawings, and from the claims.

DETAILED DESCRIPTION

Figure 1:
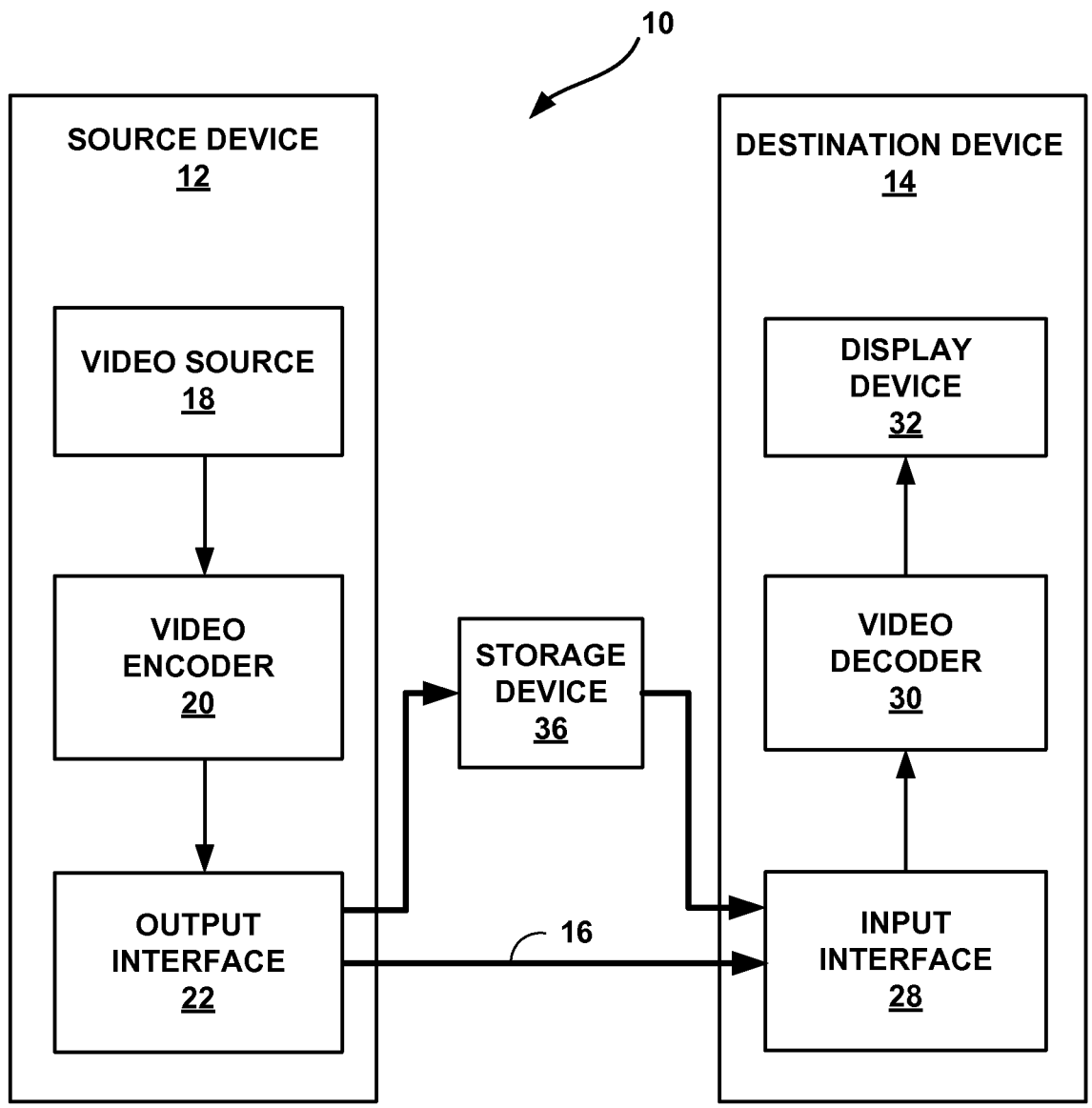
FIG. 1 is a block diagram illustrating an example video encoding and decoding system that may be configured to utilize the techniques described in this disclosure for generating depth map estimates for inter-view motion prediction and/or inter-view residual prediction in multiview video coding.

The techniques described in this disclosure are generally related to multiview video coding, e.g., the coding of two or more views. More particularly, the techniques are related to video coding using a multiview coding (MVC) process, such as an MVC plus depth process. For example, the techniques may be applied to a 3D-HEVC encoder-decoder (codec) in which MVC or MVC plus depth coding processes are used. An HEVC extension for 3D-HEVC coding processes is currently under development and, as presently proposed, makes use of MVC or MVC plus depth coding processes. Additionally, the techniques described in this disclosure are related to motion vector prediction and/or residual prediction in the context of multiview video coding, such as video coding according to 3D-HEVC. The techniques described herein may be implemented by video codecs configured according to any of a variety of video coding standards, including the standards described in this disclosure.

As one example, the techniques described in this disclosure may be implemented by a High Efficiency Video Coding (HEVC) codec configured to perform 3D-HEVC coding processes, as discussed above. However, other example video coding standards that possibly could be extended or modified for use with the techniques of this disclosure include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. A joint draft of MVC is described in "Advanced video coding for generic audiovisual services," ITU-T Recommendation H.264, March 2010, which as of Jun. 6, 2012 is downloadable from http://www.itu.int/ITU-T/recommendations/rec.aspx?id=10635.

High Efficiency Video Coding (HEVC) is currently being developed by the Joint Collaboration Team on Video Coding (JCT-VC) of ITU-T Video Coding Experts Group (VCEG) and ISO/IEC Motion Picture Experts Group (MPEG). A recent draft of HEVC is available from: http://wg11.sc29.org/jct/doc_end_user/current_document.php?id=5885/JCTVC- I1003-v2. Another recent draft of the HEVC standard, referred to as "HEVC Working Draft 7" is downloadable from: http://phenix.it-sudparis.eu/jct/doc_end_user/documents/9_Geneva/wg11/JCTVC-I1003-v3.zip, as of Jun. 6, 2012. The full citation for the HEVC Working Draft 7 is document HCTVC-I1003, Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, $9^{th}$ Meeting: Geneva, Switzerland, Apr. 27, 2012 to May 7, 2012. A recent draft of the AVC compatible video-plus-depth extension of the HEVC standard is downloadable from http://phenix.it-sud-paris.eu/jct2/doc_end_user/current_document.php?id=456. The full citation for this document is JCT3V-B1002, Hannuksela et al., "3D-AVC Draft Text 4," Joint Collaborative Team on 3D Video Coding Extension Development (JCT3V) of ITU-T SG 16 and ISO/IEC/JDTC 1/SC 29/WG 11, $2^{nd}$ Meeting: Shanghai, CN, Oct. 13, 2012 to Oct. 19, 2012. The latest reference software HM version 3.0 for 3D-HEVC can be downloaded from the following link: https://hevc.hhi.fraunhofer.de/svn/svn_3DVCSoftware/tags/HTM-3.0/. A software description of the software HM version 3.0 for 3D-HEVC is described in document number w12559. The full citation for w12559 is Schwarz et al., "Test Model under Consideration for HEVC based 3D video coding," MPEG Meeting ISO/IEC JTC1/SC29/WG11 MPEG2011/N12559, San Jose, Calif., February 2012.

Examples of the HEVC-based 3D Video Coding (3D-HEVC) codec presently under development by the Motion Pictures Expert Group (MPEG) are described in MPEG documents m22570, m22571 and m23698. The full citation for m22570 is: Schwarz et al., Description of 3D Video Coding Technology Proposal by Fraunhofer HHI (HEVC compatible configuration A), MPEG Meeting ISO/IEC JTC1/SC29/WG11, Doc. MPEG11/M22570, Geneva, Switzerland, November/December 2011. The full citation for m22571 is: Schwarz et al., Description of 3D Video Technology Proposal by Fraunhofer HHI (HEVC compatible; configuration B), MPEG Meeting—ISO/IEC JTC1/SC29/WG11, Doc. MPEG11/M22571, Geneva, Switzerland, November/December 2011. The full citation for m23698 is: Scharwz et al., 3D-HEVC-CE3 results on inter-view motion parameter prediction by HHI, MPEG Meeting—ISO/IEC JTC1/SC29/WG11, Doc. MPEG12/M23698, San Jose, USA, February 2012.

Each of the preceding references is incorporated herein by reference in their respective entireties. The techniques described in this disclosure are not limited to these standards, and may be extended to other standards, including standards that rely upon motion vector prediction and/or residual prediction for video coding.

FIG. 1 is a block diagram illustrating an example video encoding and decoding system 10 that may be configured to utilize the techniques described in this disclosure for generating depth map estimates for inter-view motion prediction and/or inter-view residual prediction in multiview video coding. As shown in the example of FIG. 1, system 10 includes a source device 12 that generates encoded video for decoding by destination device 14. Source device 12 may transmit the encoded video to destination device 14 via communication channel 16, or may store the encoded video on a storage device 36, e.g., storage medium or file server, such that the encoded video may be accessed by the destination device 14 as desired. Source device 12 and destination device 14 may comprise any of a wide variety of devices, including desktop computers, notebook (i.e., laptop) computers, tablet computers, set-top boxes, telephone handsets (including cellular telephones or handsets and so-called smartphones), televisions, cameras, display devices, digital media players, video gaming consoles, or the like.

In many cases, such devices may be equipped for wireless communication. Hence, communication channel 16 may comprise a wireless channel. Alternatively, communication channel 16 may comprise a wired channel, a combination of wireless and wired channels, or any other type of communication channel or combination of communication channels suitable for transmission of encoded video data, such as a radio frequency (RF) spectrum or one or more physical transmission lines. In some examples, communication channel 16 may form part of a packet-based network, such as a local area network (LAN), a wide-area network (WAN), or a global network such as the Internet. Communication channel 16, therefore, generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

As further shown in the example of FIG. 1, source device 12 includes a video source 18, video encoder 20, and an output interface 22. Video source 18 may include a video capture device. The video capture device, by way of example, may include one or more of a video camera, a video archive containing previously captured video, a video feed interface to receive video from a video content provider, and/or a computer graphics system for generating computer graphics data as the source video. As one example, if video source 18 is a video camera, source device 12 and destination device 14 may form so-called camera phones or video phones, e.g., as in smartphones or tablet computers, or other mobile computing devices. The techniques described in this disclosure, however, are not limited to wireless applications or settings, and may be applied to non-wireless devices including video encoding and/or decoding capabilities. Source device 12 and destination device 14 are, therefore, merely examples of coding devices that can support the techniques described herein.

Video encoder 20 may encode the captured, pre-captured, or computer-generated video, as will be described in greater detail below. Video encoder 20 may output the encoded video to output interface 22, which may provide the encoded video to destination device 14 via communication channel 16. Output interface 22 may, in some examples, include a modulator/demodulator ("modem") and/or a transmitter.

Output interface 22 may additionally or alternatively provide the captured, pre-captured, or computer-generated video that is encoded by the video encoder 20 to storage device 36 for later retrieval, decoding and consumption. Storage device 36 may include Blu-ray discs, DVDs, CD-ROMs, flash memory, or any other suitable digital storage media for storing encoded video. Destination device 14 may access the encoded video stored on the storage device, decode this encoded video to generate decoded video and playback this decoded video.

Storage device 36 may additionally or alternatively include any type of server capable of storing encoded video and transmitting that encoded video to the destination device 14. Example a file server, a web server (e.g., for a website), an FTP server, network attached storage (NAS) devices, a local disk drive, or any other type of device capable of storing encoded video data and transmitting it to a destination device. The transmission of encoded video data from storage device 36 may be a streaming transmission, a download transmission, or a combination of both. Destination device 14 may access storage device 36 in accordance with any standard data connection, including an Internet connection. This connection may include a wireless channel (e.g., a Wi-Fi connection or wireless cellular data connection), a wired connection (e.g., DSL, cable modem, etc.), a combination of both wired and wireless channels or any other type of communication channel suitable for accessing encoded video data stored on a file server.

Destination device 14, in the example of FIG. 1, includes an input interface 28 for receiving information, including coded video data, a video decoder 30, and a display device 32. The information received by input interface 28 may include a variety of syntax information generated by video encoder 20 for use by video decoder 30 in decoding the associated encoded video data. Each of video encoder 20 and video decoder 30 may form part of a respective encoder-decoder (CODEC) that is capable of encoding or decoding video data.

Display device 32 of destination device 14 represents any type of display capable of presenting video data for consumption by a viewer. Although shown as integrated with destination device 14, display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

As discussed above, the techniques described in this disclosure are generally related to multiview or 3D video coding, e.g., involving the coding of two or more texture views and/or views including texture and depth components. In some examples, 3D video coding techniques may use multiview coding (MVC) or MVC plus depth processes, e.g., as in the 3D-HEVC standard currently under development. In some examples, the video data encoded by video encoder 20 and decoded by video decoder 30 includes two or more pictures at any given time instance, i.e., within an "access unit," or data from which two or more pictures at any given time instance can be derived.

In some examples, a device, e.g., video source 18, may generate the two or more pictures by, for example, using two or more spatially offset cameras, or other video capture devices, to capture a common scene. Two pictures of the same scene captured simultaneously, or nearly simultaneously, from slightly different horizontal positions can be used to produce a three-dimensional effect. In some examples, video source 18 (or another component of source device 12) may use depth information or disparity information to generate a second (or other additional) picture of a second (or other additional) view at a given time instance from a first picture of a first view at the given time instance. In this case, a view within an access unit may include a texture component corresponding to a first view and a depth component that can be used, with the texture component, to generate a second view. The depth or disparity information may be determined by a video capture device capturing the first view, e.g., based camera parameters or other information known regarding the configuration of the video capture device and the capturing of the video data for the first view. The depth or disparity information may additionally or alternatively be calculated, e.g., by video source 18 or another component of source device 12, from camera parameters and/or video data in the first view.

To present 3D video, display device 32 may simultaneously, or nearly simultaneously, display two pictures associated with different views of a common scene, which were captured simultaneously or nearly simultaneously. In some examples, a user of destination device 14 may wear active glasses to rapidly and alternatively shutter left and right lenses, and display device 32 may rapidly switch between a left view and a right view in synchronization with the active glasses. In other examples, display device 32 may display the two views simultaneously, and the user may wear passive glasses, e.g., with polarized lenses, which filter the views to cause the proper views to pass through to the user's eyes. In other examples, display device 32 may comprise an autostereoscopic display, which does not require glasses for the user to perceive the 3D effect.

Video encoder 20 and video decoder 30 may operate according to any of the video coding standards referred to herein, such as the HEVC standard and the 3D-HEVC extension presently under development. When operating according to the HEVC standard, video encoder 20 and video decoder 30 may conform to the HEVC Test Model (HM). The techniques of this disclosure, however, are not limited to any particular coding standard.

HM refers to a block of video data as a coding unit (CU). In general, a CU has a similar purpose to a macroblock coded according to H.264, except that a CU does not have the size distinction associated with the macroblocks of H.264. Thus, a CU may be split into sub-CUs. In general, references in this disclosure to a CU may refer to a largest coding unit (LCU) of a picture or a sub-CU of an LCU. For example, syntax data within a bitstream may define the LCU, which is a largest coding unit in terms of the number of pixels. An LCU may be split into sub-CUs, and each sub-CU may be split into sub-CUs. Syntax data within a bitstream may define a maximum number of times an LCU may be split, referred to as a maximum CU depth. Accordingly, a bitstream may also define a smallest coding unit (SCU).

An LCU may be associated with a hierarchical quadtree data structure. In general, a quadtree data structure includes one node per CU, where a root node corresponds to the LCU. If a CU is split into four sub-CUs, the node corresponding to the CU includes a reference for each of four nodes that correspond to the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs.

A CU that is not split may include one or more prediction units (PUs). In general, a PU represents all or a portion of the corresponding CU, and includes data for coding the block of video data associated with the PU. For example, the PU may include data indicating a prediction mode for coding the associated block of video data, e.g., whether the block is intra-coded or inter-coded. An intra-coded block is coded based on an already-coded block in the same picture. An inter-coded block is coded based on an already-coded block of a different picture. The different picture may be a temporally different picture, i.e., a picture before or after the current picture in a video sequence.

In the case of multiview coding, e.g., in 3D-HEVC, the different picture may be a picture that is from the same access unit as the current picture, but associated with a different view than the current picture. In this case, the inter-prediction can be referred to as inter-view coding. When coding a picture of a non-base view, e.g., a dependent view, a picture from the same access unit but a different view, e.g., from a reference view, may be added into a reference picture list. An interview reference picture can be put into any position of a reference picture list, as is the case with any inter prediction (e.g., temporal or inter-view) reference picture.

The block of the different picture used for predicting the block of the current picture is identified by a prediction vector. In multiview coding, there are two kinds of prediction vectors. One is a motion vector pointing to a block in a temporal reference picture, and the corresponding inter prediction is referred to as motion-compensated prediction (MCP). The other type of prediction vector is a disparity vector, which points to a block in a picture in the same access unit current picture, but of a different view. With a disparity vector, the corresponding inter prediction is referred to as disparity-compensated prediction (DCP).

The data defining a motion vector or disparity vector may describe, for example, a horizontal component of the prediction vector, a vertical component of the prediction vector, and a resolution for the prediction vector (e.g., integer precision, one-quarter pixel precision or one-eighth pixel precision). The data for the PU may also include data indicating a direction of prediction, i.e., to identify which of reference picture lists L0 and L1 should be used. The data for the PU may also include data indicating a reference picture to which the motion vector or disparity motion vector points, e.g., a reference picture index into a list of reference pictures. Data for the CU defining the PU(s) may also describe, for example, partitioning of the CU into one or more PUs. Partitioning modes may differ between whether the CU is uncoded, intra-prediction mode encoded, or inter-prediction mode encoded.

In addition to having one or more PUs, a CU may include one or more transform units (TUs). Following prediction using a PU, a video encoder may calculate residual values for the portion of the CU corresponding to the PU, where these residual values may also be referred to as residual data. The residual values may comprise pixel difference values, e.g., differences between coded pixels and predictive pixels, where the coded pixels may be associated with a block of pixels to be coded, and the predictive pixels may be associated with one or more blocks of pixels used to predict the coded block. A TU is not necessarily limited to the size of a PU. Thus, TUs may be larger or smaller than corresponding PUs for the same CU. In some examples, the maximum size of a TU may be the size of the corresponding CU. This disclosure uses the term "block" or "video block" to refer to any one or combination of a CU, PU, and/or TU.

To further compress the residual values of a block, the residual values may be transformed into a set of transform coefficients that compact data (also referred to as "energy") as possible into coefficients. Transform techniques may comprise a discrete cosine transform (DCT) process or conceptually similar process, integer transforms, wavelet transforms, or other types of transforms. The transform converts the residual values of the pixels from the spatial domain to a transform domain. The transform coefficients correspond to a two-dimensional matrix of coefficients that is ordinarily the same size as the original block. In other words, there are just as many transform coefficients as pixels in the original block. However, due to the transform, many of the transform coefficients may have values equal to zero.

Video encoder 20 may then quantize the values of the transform coefficients to further compress the video data. Quantization generally involves mapping values within a relatively large range to values in a relatively small range, thus reducing the amount of data needed to represent the quantized transform coefficients. The quantization process may reduce the bit depth associated with some or all of the coefficients.

Following quantization, video encoder 20 may scan the transform coefficients, producing a one-dimensional vector from the two-dimensional matrix including the quantized transform coefficients. Video encoder 20 may then entropy encode the one-dimensional vector to even further compress the data. In general, entropy coding comprises one or more processes that collectively compress a sequence of quantized transform coefficients and/or other syntax information. Entropy coding may include, as examples, content adaptive variable length coding (CAVLC), context adaptive binary arithmetic coding (CABAC), syntax-based context-adaptive binary arithmetic coding (SBAC), Probability Interval Partitioning Entropy (PIPE) coding, or another entropy encoding methodology.

As discussed above, the data defining a motion vector or disparity vector for a block of video data may include horizontal and vertical components of the prediction vector, as well as a resolution for the prediction vector. In other examples, the data defining the motion vector or disparity vector may describe the vector in terms of what is referred to as a motion vector predictor (MVP). A MVP for a current PU may be a motion vector of a spatially-neighboring PU, i.e., a PU that is adjacent the current PU being coded. Alternatively, a MVP for a current PU may be a motion vector of a co-located block, or neighboring block of such a co-located block, in another picture. As a further alternative, a MVP for a current PU may be a motion vector or disparity vector derived from a reference block in an interview reference picture (i.e., a reference picture in the same access unit as the current picture, but from a different view).

Typically, a candidate list of MVPs is formed in a defined manner, such as by listing the MVPs starting with those having the least amplitude to those having the greatest amplitude, i.e., least to greatest displacement between the current PU to be coded and the reference PU, or listing the MVPs based on the location of the reference block, e.g., spatially left, spatially above, interview reference picture, or temporal reference picture.

After forming the list of MVPs, video encoder 20 may assess each of the MVPs to determine which provides the best rate and distortion characteristics that best match a given rate and distortion profile selected for encoding the video. Video encoder 20 may perform a rate-distortion optimization (RDO) procedure with respect to each of the MVPs, selecting the one of the MVPs having the best RDO results. Alternatively, video encoder 20 may select one of the MVPs stored to the list that best approximates a motion vector determined for the current PU. In any event, video encoder 20 may specify the selected MVP using an index identifying the selected one of the MVPs in the candidate list of MVPs. Video encoder 20 may signal this index in the encoded bitstream for used by video decoder 30.

According to one technique for using MVPs, video encoder 20 and video decoder 30 may implement what is referred to as a "merge mode." In general, according to merge mode, a current block, e.g., PU, inherits the prediction vector from another previously-coded block, e.g., a neighboring block, or a block in a temporal or interview reference picture. When implementing the merge mode, video encoder 20 constructs a list of candidate MVPs (reference pictures and motion vectors) in a defined matter, selects one of the candidate MVPs, and signals a candidate list index identifying the selected MVP to video decoder 30 in the bitstream. Video decoder 30, in implementing the merge mode, receives this candidate list index, reconstructs the candidate list of MVPs according to the defined manner, and selects the one of the MVPs in the candidate list indicated by the index. Video decoder 30 then instantiates the selected one of the MVPs as a prediction vector for the current PU at the same resolution of the selected one of the MVPs, and pointing to the same reference picture to which the selected one of the MVPs points. At the decoder side, once the candidate list index is decoded, all of the motion parameters of the corresponding block of the selected candidate are inherited such as, e.g., motion vector, prediction direction, and reference picture index. Merge mode promotes bitstream efficiency by allowing the video encoder 20 to signal an index into the candidate MVP list, rather than all of the information defining a prediction vector.

Another technique by which video encoder 20 and video decoder 30 utilize MVPs is referred to as "advanced motion vector prediction" (AMVP). Similar to merge mode, when implementing AMVP, video encoder 20 constructs a list of candidate MVPs in a defined matter, selects one of the candidate MVPs, and signals a candidate list index identifying the selected MVP to video decoder 30 in the bitstream. Similar to merge mode, when implementing AMVP, video decoder 30 reconstructs the list of candidate MVPs in the defined matter, decodes the candidate list index from the encoder, and selects and instantiates one of the MVPs based on candidate list index.

However, contrary to the merge mode, when implementing AMVP, video encoder 20 also signals a reference picture list and a reference picture index into the reference picture list, thus specifying the reference picture to which the MVP specified by the candidate list index points. Additionally, for AMVP, both video encoder 20 and video decoder 30 construct the candidate list based on the selected reference picture list, and the reference picture index into the selected list. In particular, which candidates are selected for inclusion in the list is determined based on the selected reference picture list, and the reference picture index into the selected list. Further, video encoder 20 determines a motion vector difference (MVD) for the current block, where the MVD is a difference between the MVP and the actual motion vector or disparity motion vector that would otherwise be used for the current block.

For AMVP, in addition to the reference picture index and candidate list index, video encoder 20 signals the MVD for the current block in the bitstream. Due to the signaling of the reference picture index and prediction vector difference for a given block, AMVP may not be as efficient as merge mode, but may provide improved fidelity of the coded video data. In general, the techniques described herein are described as being implemented in a video coder using AMVP. However, techniques may, in some examples, be applied by a video coder using merge mode, skip mode, or any other mode of using MVPs to represent inter-picture prediction vectors.

One of the most efficient coding tools is inter-view motion prediction, e.g., using an inter-view motion vector predictor (IVMP) for merge mode or AVMP, wherein the motion parameters of a block in a dependent view are predicted or inferred based on already coded motion parameters in another view in the same access unit. In order to derive the candidate motion parameters for a current block in a dependent view a video coder, e.g., video encoder 20 or video decoder 30, converts a depth value associated with the current block into a disparity vector. The video coder uses the disparity vector to identify a reference, i.e., prediction, block in the reference picture of the reference, e.g., base, view. The video coder may use the motion parameters of the reference block, or the disparity vector, as the motion parameters for the current block, e.g., the IVMP for the current block.

Another coding tool is inter-view residual prediction, which is part of the current HEVC 3D video coding extension. In inter-view residual prediction, there are essentially two predictions: a prediction of the current block being coded from a reference block; and a prediction of the residual value for the current block from the residual value of a residual reference block. The residual reference block is a block from a reference picture in a reference view in the same access unit, and may be identified based on the disparity vector for the current block, in a similar manner to identifying a reference block for inter-view motion prediction. In inter-view residual prediction, the first prediction of the current block from a reference block may be, but is not necessarily, an inter-view motion prediction based on a reference block identified by the disparity vector for the current block. In other words, one or both of inter-view motion prediction and inter-view residual prediction may be used to code a particular block. Both inter-view motion prediction and inter-view residual prediction utilize a disparity vector for the current block to identify the reference block or residual reference block, respectively.

3D-HEVC supports two methods to construct disparity vectors for inter-view motion prediction and inter-view residual prediction. According to one of the methods, the video coder derives the disparity vectors directly from coded depth view components. According to the other method supported by 3D-HEVC, the video coder generates disparity vectors for each pixel only from the disparity vectors and the motion vectors. This latter method is simplified in m23698, which is referenced above.

One problem with the latter method supported by 3D-HEVC is that the inter-view motion prediction coding of one or more dependent views depends on the coding of one or more other dependent views. More particularly, according to the current implementation of 3D-HEVC, a video coder derives a dependent depth map estimate for a first dependent view based on the coding of texture data for the dependent view. The video coder then warps the dependent depth map estimate to the base, or reference, view to produce a common base depth map estimate that is shared by all of the dependent views. The video coder then warps the base depth map estimate to a second dependent view to produce a second dependent depth map estimate for the second view, and enables inter-view motion prediction coding of texture data of the second dependent view based on the dependent depth map estimate for the second view.

In this manner, according to the current implementation of 3D-HEVC, the coding of the texture data of the second dependent view is not independent of the coding of the texture data of the first dependent view. The coding of the second dependent view depends on the second dependent depth map estimate, which is derived from warping the first dependent depth map estimate to the second dependent view through the base view. In turn, the first dependent depth map is dependent on the decoding of the texture data of the first dependent view. This dependency between dependent views in the current implementation of 3D-HEVC is present even when the dependent views are supposed to be coded independently due to disabling texture prediction between the views. This dependency between dependent views results in a lack of bitstream extraction functionality for, e.g., two stereo operation points sharing the same base view. For example, whenever the dependent depth map estimate is derived, e.g., after a specific CU or other block is coded with DCP or otherwise, in the first dependent view, the dependent depth map estimate is used to update the base depth map estimate, which may be used to derive the depth map estimate of the other dependent view in a later access unit.

The techniques described herein may facilitate independent decoding of the dependent views by avoiding dependencies between depth map estimates of different views. For example, a depth map estimate used for inter-view motion prediction or inter-view residual prediction of one dependent view will not depend upon warping a depth map estimate of another dependent view. Accordingly, bitstream extraction functionality for various views available in coded multiview video data may be improved.

In some examples according to the techniques described herein, each of a plurality of dependent views is associated with a dependent depth view estimate, which may be generated or updated based on coding of the texture data of the dependent view relative to a base view. In such examples, each of the dependent depth map estimates may be warped to the base view to produce a respective one of a plurality of base depth map estimates. Each dependent depth map estimate and the respective base depth map estimate for a depth map estimate pair associated with the respective one of the plurality of dependent views. Accordingly, contrary to the current implementation of 3D-HEVC, a common base depth map estimate is not shared by each of the dependent views. Instead, according to the techniques of this disclosure, each dependent view is associated with a respective depth map estimate pair including a dependent depth map estimate and a base depth map estimate.

In some examples according to this disclosure, a video coder, e.g., video encoder 20 or video decoder 30, updates each of the base depth map estimates of the depth map estimate pairs after the decoding of the non-anchor pictures in the base view. The video coder may warp the updated base depth map estimates to the respective dependent views to produce updated dependent depth map estimates. The video coder may inter-view motion prediction code texture data of a dependent view based upon its updated dependent depth map estimate. In some examples, for anchor pictures in dependent views, inter-view motion prediction may be disabled, while for non-anchor pictures in dependent views, inter-view motion prediction is enabled.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Figure 2:
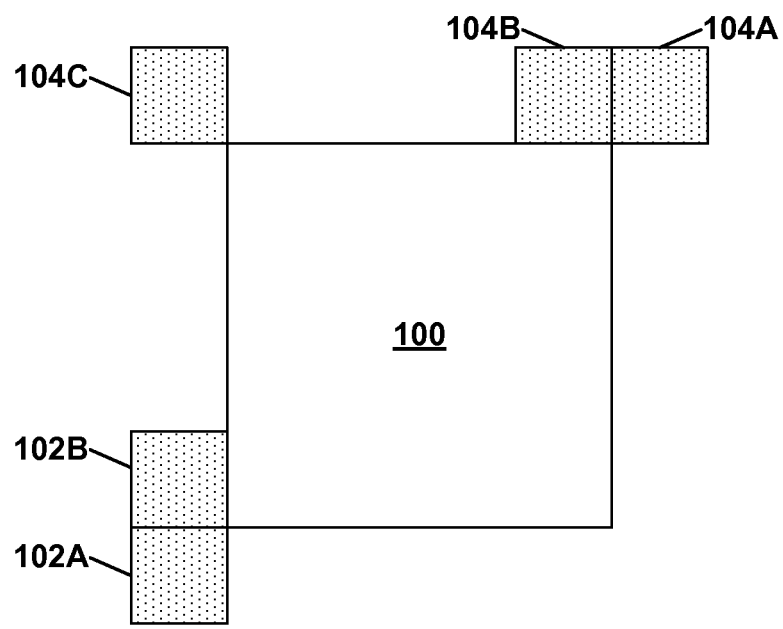
FIG. 2 is a conceptual diagram illustrating an example current video block in relation to a plurality of spatially-neighboring blocks from which spatial motion vector predictors for the current block may be derived.

FIG. 2 is a conceptual diagram illustrating an example current video block 100 in relation to a plurality of spatially-neighboring, e.g., adjacent, blocks 102A-B and 104A-C blocks from which spatial motion vector predictors for the current block may be derived. Spatially-neighboring blocks 102A-B are left of current block 100, and spatially-neighboring blocks 104A-C are above current block 100. In some examples, video block 100 and video blocks 102A-B and 104A-C may be PUs, as generally defined in the HEVC standard currently under development.

The spatial relationship of each of spatially-neighboring blocks 102A-B and 104A-C to current block 100 may be described as follows. A luma location (xP, yP) is used to specify the top-left luma sample of the current block relative to the top-left sample of the current picture. Variables nPSW and nPSH denote the width and the height of the current block for luma. The top-left luma sample of spatially-neighboring block 102A is xP−1, yP+nPSH. The top-left luma sample of spatially-neighboring block 102B is xP−1, yP+nPSH−1. The top-left luma sample of spatially-neighboring block 104A is xP+nPSW, yP−1. The top-left luma sample of spatially-neighboring block 104B is xP+nPSW−1, yP−1. The top-left luma sample of spatially-neighboring block 104C is xP−1, yP−1. Although described with respect to luma locations, the current and reference blocks may include chroma components.

Each of spatially-neighboring blocks 102A-B and 104A-C may provide a candidate spatial motion vector predictor (MVP), e.g., a spatial candidate motion vector, for motion vector prediction coding, e.g., according to merge mode or AVMP, of block 100. Typically, a video coder selects one of spatially-neighboring blocks 102A-B to the left of current block 100 to provide a first spatial MVP, referred to "mvA" for block 100. The video coder then selects one of spatially-neighboring blocks 104A-C above current block 100 to provide a second spatial MVP, referred to "mvB" for block 100.

To select mvA and mvB from among spatially-neighboring blocks 102A-B and 104A-C, the video coder may determine which of spatially-neighboring blocks 102A-B and 104A-C are available. Again, the video coder may be a video encoder, such as video encoder 20, or video decoder, such as video decoder 30. Both a video encoder and video decoder may construct a candidate list of MVPs for merge mode or AVMP in the same predetermined manner, so that, for example, an encoder may need only signal an index into the candidate list to signal a selected MVP. Some of blocks 102A-B and 104A-C may be unavailable to provide a candidate MVP if, for example, the blocks were intra-coded, or if current block 100 is located proximate a picture or slice boundary. The video coder may select mvA and mvB from among available spatially-neighboring blocks 102A-B and 104A-C, based on a predetermined preference, rate-distortion optimization (RDO), or other factors.

In the illustrated example, spatially-neighboring blocks 102A-B and 104A-C are to the left of, and above, block 100, respectively. This arrangement is typical, as most video coders code video blocks in raster scan order from the top-left of a picture. Accordingly, in such examples, spatially-neighboring blocks 102A-B and 104A-C will typically be coded prior to current block 100. However, in other examples, e.g., when a video coder codes video blocks in a different order, spatially-neighboring blocks 102A-B and 104A-C may be located to the right of, or below, current block 100.

Figure 3:
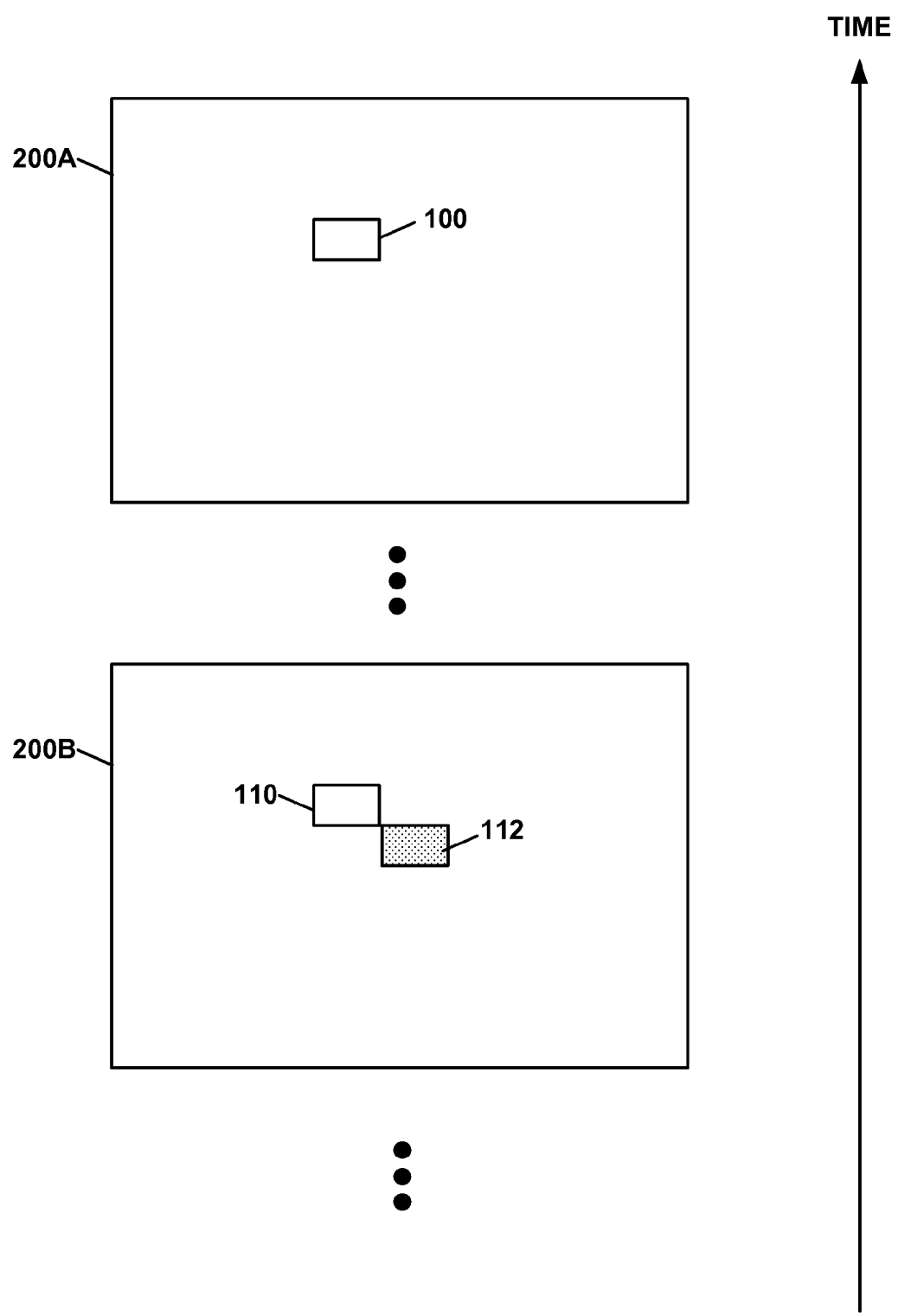
FIG. 3 is a conceptual diagram illustrating an example picture including a current video block, and a temporal reference picture including a reference block from which a temporal motion vector predictor (TMVP) may be derived.

FIG. 3 is a conceptual diagram illustrating an example picture 200A including a current video block 100, and a temporal reference picture 200B, within a video sequence. Temporal reference picture 200B is a picture coded prior to picture 200A. Moreover, it is assumed that temporal reference picture 200B and picture 200A are within the same view. Temporal reference picture 200B is not necessarily the immediately prior picture, in coding order, to picture 200A, and may be after picture 200A in display order. A video coder may select temporal reference picture 200B from among a plurality of possible temporal reference pictures, and a reference picture list and reference picture index value may indicate which of the temporal reference pictures to select. For example, if a current slice is a B slice, a video coder may code a collocated_from_10_flag in a slice header to indicate whether the reference picture picture is from RefPicList0 or RefPicList1. The video coder may also code a collocated_ref_idx in the slice header to identify the picture in the picture in the list.

Temporal reference picture 200B includes a co-located block 110, which is co-located in picture 200B relative to the location of current block 100 in picture 200A. Temporal reference picture 200B also includes a temporal reference block 112 for current block 100 in picture 200A. A video coder may derive a TMVP for current block 100 based on prediction parameters of reference block 112. Alternatively, a video coder may derive a TMVP for current block 100 based on prediction parameters of a PU in a bottom-right partition of co-located block 110. In general, in the nomenclature of HEVC, a video coder may use the motion information of a bottom-right PU to a CU containing a co-located PU to current block 100, or the motion information of a bottom-right PU within the PUs of the CU containing the co-located PU to current block 100, to predict motion information of current block 100.

Temporal reference block 112 is a spatially-neighboring block to co-located block 110. In the illustrated example, reference block 112 is located to the right of and below co-located block 110. In some examples, reference block may be a right-bottom PU of the CU containing the co-located PU, e.g., co-located block 110, or the right-bottom PU within the center PUs of the CU containing the co-located PU. In other examples, reference block 112 may be any spatially-neighboring, e.g., adjacent, block of co-located block 110. In some examples, a video coder may derive a TMVP for current block 100 from co-located block 110 instead of, or in addition to, a neighboring block of the co-located block.

To select a TMVP for current block 100 from amongst a plurality of candidates in temporal reference picture 200B, a video coder may determine which candidate temporal reference blocks are available. Some of the candidate temporal reference blocks may be unavailable to provide a candidate TMVP if, for example, the blocks were intra-coded, or if co-located block 110 is located proximate a picture or slice boundary. If more than one TMVP candidate is available, the video coder may select one of the candidates based on a predetermined preference, rate-distortion optimization (RDO), or other factors. Motion vectors identified as a TMVP candidate for a current block for merge mode or AMVP may need to be scaled based on temporal location, e.g., as reflected by picture order count (POC) values of the current picture and reference picture(s).

Figure 4:
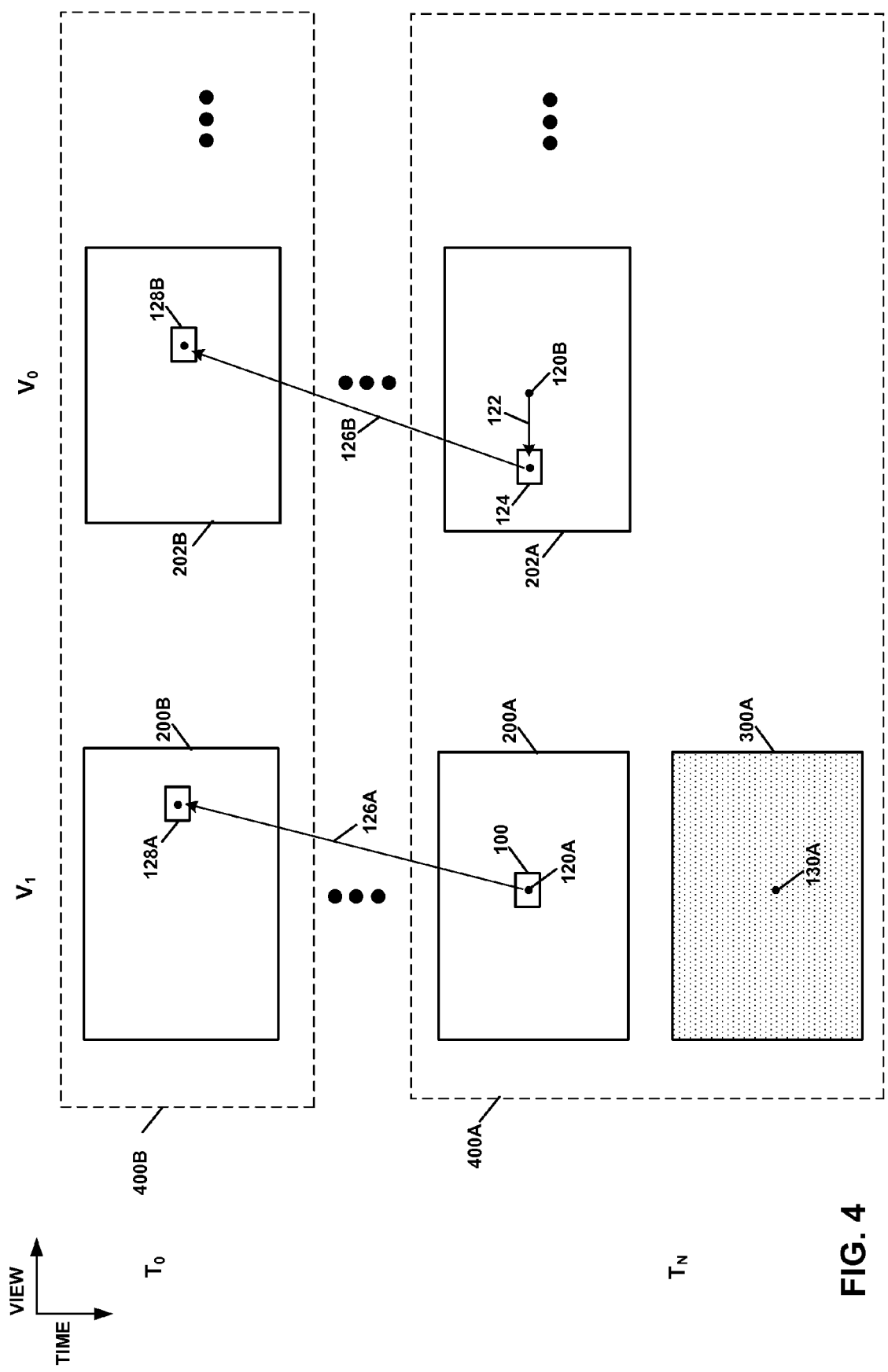
FIG. 4 is a conceptual diagram illustrating example pictures of a plurality of access units, each access unit including a plurality of views, and derivation of an inter-view motion vector predictor (IVMP) based on an estimated depth map.

FIG. 4 is a conceptual diagram illustrating pictures of a plurality of access units, each access unit including a plurality of views. In particular, FIG. 4 illustrates access units 400A and 400B, each of which may represent a different point in time (that is, display time, or output time) in a video sequence. Although two access units 400A and 400B are illustrated, the video data may include many additional access units, both forward and backward in the sequence relative to access unit 400A, and access units 400A and 400B need not be adjacent or consecutive access units.

The video data including access units 400A and 400B is MVC video data, i.e., includes multiple views of a common scene. FIG. 4 illustrates pictures of two views, $V_0$ and $V_1$. The video data may include additional views not shown in FIG. 4.

Access unit 400A includes picture 200A of $V_1$. Picture 200A includes current block 100. Access unit 400A may be referred to as the current access unit, $V_1$ may be referred to as the current view, and picture 200A may be referred to as the current picture. Access unit 400A also includes picture 202A of $V_0$. $V_0$ may be referred to as a reference view relative to $V_1$, and picture 202A may be referred to as an inter-view reference picture relative to picture 200A. Access unit 400B includes picture 200B of $V_1$, and picture 202B of $V_0$. Picture 200B of $V_1$ may be referred to as a temporal reference picture for picture 200A.

One of the most efficient coding tools in 3D-HEVC is inter-view motion prediction (IMP), where the motion parameters of a block in a dependent view are predicted or inferred based on already coded motion parameters in another view, i.e., a reference view, of the same access unit. To include the inter-view motion prediction, the AMVP mode, as well as the merge mode, for 3D-HEVC has been extended in a way that an IVMP (inter-view motion vector predictor) candidate is added to the candidate list of MVPs for a block to be coded.

To derive an IVMP for current block 100 in AVMP, a video coder identifies a sample 120A in block 100, and a co-located sample 120B in inter-view reference picture 202A. Based on disparity information for picture 200A relative to interview reference picture 202A, the video coder determines a disparity vector 122. The disparity information could be derived from a depth map or other depth information for picture 200A. In the example illustrated by FIG. 4, a video coder derives the disparity information from a depth map estimate 300A, e.g., depth map estimate picture (DMEP), for current picture 200A. More particularly, the video coder determines disparity vector 122 based on the estimated depth value(s) at the location 130A of depth map estimate 300A that corresponds to sample 120A in block 100 of current picture 200A. As described in greater detail herein, e.g., with respect to FIGS. 5-9, a video coder may derive depth map estimate 300A for texture picture 200A of dependent view $V_1$ based on warping a depth map estimate for another picture, e.g., reference picture 202A of reference (or base) view $V_0$.

Based on disparity vector 122, the video coder identifies a reference block 124 in inter-view reference picture 202A of the reference view ($V_0$). If the reference picture index for current block 100 refers to inter-view reference picture 202A, the video coder sets the IVMP for current block 100 equal to disparity vector 122, which then becomes a so-called disparity motion vector for block 100. In particular, the disparity motion vector points to the block 124 in picture 202A as a reference block for prediction of block 100A in picture 200A. The disparity vector may also be referred to as a Disparity Vector for Inter-View Motion Prediction (DVIVMP), which is a disparity vector constructed and is used for inter-view motion prediction.

If the current reference picture index for current block 100 refers to temporal reference picture 200B in access unit 400B, the video coder determines whether reference block 124 was coded based on a motion vector that referred to the same access unit 400B as the current reference index. In the example illustrated by FIG. 4, reference block 124 was coded based on a motion vector 126B that points to a block 128B in picture 202B in access unit 400B. In such cases, the video coder sets the IVMP for current block 100 equal to a motion vector 126A that points to a temporal reference block 128A in temporal reference picture 200B of $V_1$. Motion vector 126A corresponds to motion vector 126B, e.g., the X, Y and other values of the motion vectors are the same, but motion vectors 126A and 126B refer to different pictures associated with different views in the same access unit. In some examples, if the motion vector of reference block 124 points to a different access unit then the reference picture index for current block 100, the video coder may consider IVMP unavailable for current block 100.

For inter-view motion vector prediction in the merge mode (and skip mode), the first two reference indices of the reference picture list are investigated in the given order. A motion vector candidate for the reference index 0 is derived in the same way as for the AMVP mode. If the derived motion vector is valid, the reference index 0 and the derived motion vector are used for the considered hypothesis. Otherwise, the reference index 1 is tested in the same way. If it also results in an invalid motion vector, the motion hypothesis is marked as not available. In order to prefer temporal prediction, the order in which is reference indices are tested may be reversed if the first index refers to an inter-view reference picture. If all potential motion hypotheses are marked as not available, the inter-view candidate, i.e., IVMP, may not be selected, and in some instances cannot be selected.

Another coding tool in 3D-HEVC is inter-view residual prediction. For inter-view residual prediction of current block 100, a residual reference block may be identified based on disparity vector 122. Disparity vector 122 identifies block 124 of picture 202A in reference view $V_0$, which, in the case of inter-view residual prediction, acts as a residual reference block 124. As discussed above, a video coder may determine disparity vector 122 based on the estimated depth value(s) at the location 130A of depth map estimate 300A that corresponds to sample 120A in block 100 of current picture 200A. As described in greater detail herein, e.g., with respect to FIGS. 5-9, a video coder may derive depth map estimate 300A for texture picture 200A of dependent view $V_1$ based on warping a depth map estimate for another picture, e.g., reference picture 202A of reference (or base) view $V_0$.

For inter-view residual prediction of current block 100, there are essentially two predictions. The first prediction for current block 100 is relative to a reference block, which may be according to any of the techniques described herein, e.g., temporal or inter-view motion prediction. For example, the first prediction for current block may be based on the prediction of reference block 124 according to inter-view motion prediction as described above. The second prediction for current block 100 is a prediction of the residual value based on the residual value of reference block 124, which is identified based on disparity vector 122. For inter-view residual prediction, the residual value signaled from a video encoder to a video decoder is the remainder after the reference block and the residual from the residual reference block are both subtracted from the current block, e.g., after reference block 124 and the residual after coding reference block 124 are both subtracted from current block 100. In this manner, the residual for current block 100 may be reduced relative to the difference between the current block and the reference block by inter-view residual prediction and, thus, the amount of information transformed, inverse transformed, quantized, entropy coded, and signaled for the coding of block 100 may be reduced.

Figure 5:
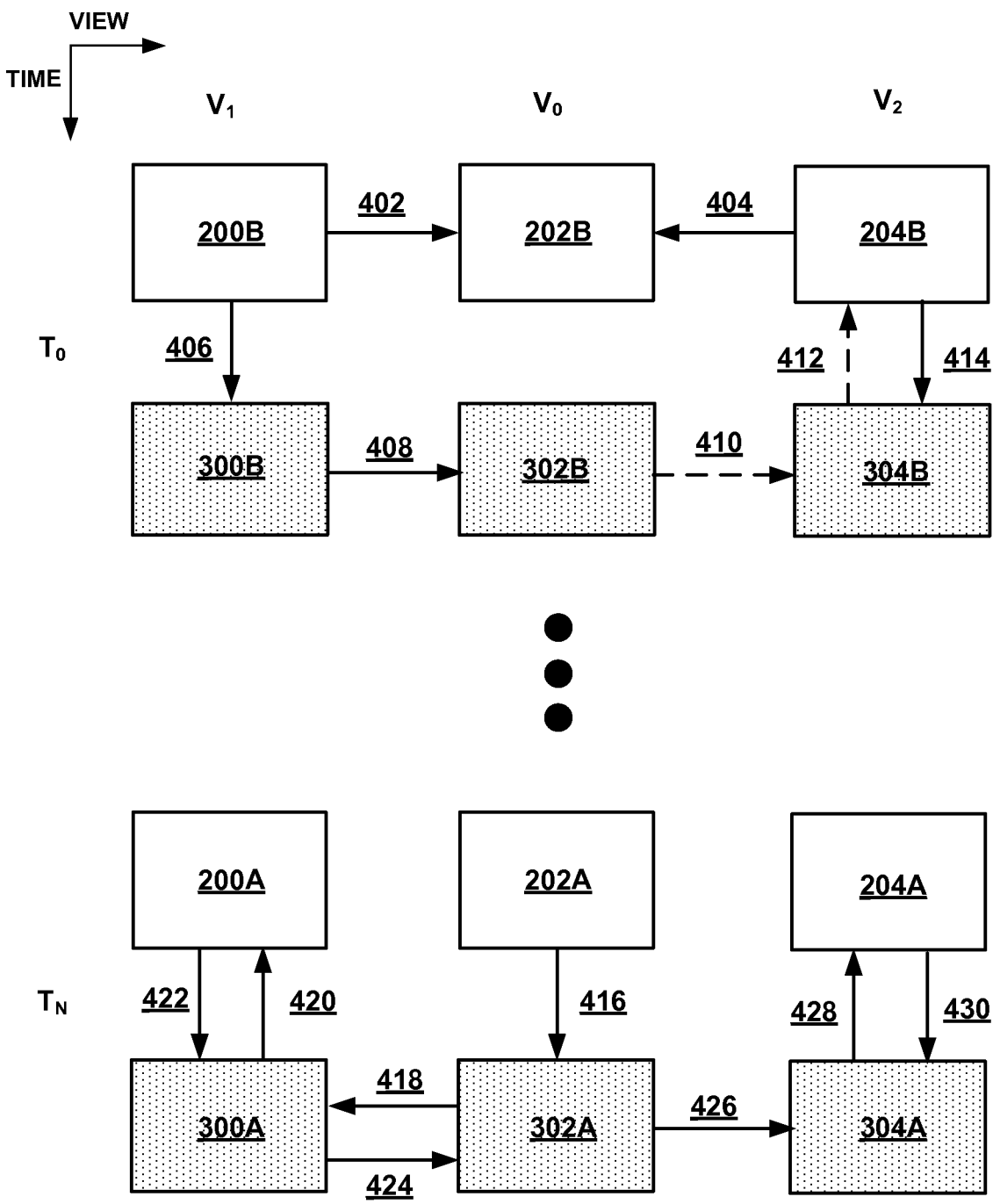
FIG. 5 is a conceptual diagram illustrating example differences between generation of depth map estimates for inter-view motion prediction and/or inter-view residual prediction as currently defined and according to the techniques of this disclosure.

FIG. 5 is a conceptual diagram illustrating example differences between generation of depth map estimates, e.g., depth map estimate 300A, for inter-view motion prediction and/or inter-view residual prediction as currently defined in 3D-HEVC and according to the techniques of this disclosure. More particularly, FIG. 5 illustrates an example in which the video data includes three views: a base (reference) view denoted by $V_0$, a first dependent (non-base) view $V_1$ and a second dependent (non-base) view $V_2$. In the example of FIG. 5, the coding order of the three views is: base view $V_0$, dependent view $V_1$, and dependent view $V_2$. Although the example of FIG. 5 includes three views, the techniques of this disclosure may be applied to video data including any number of views, including any number of base and reference views.

FIG. 5 illustrates two access units at two different points in time, denoted $T_0$ and $T_N$, in a video stream. Each of the access units includes a respective texture picture for each of the views. The access unit at $T_0$ includes picture 202B of base view $V_0$, picture 200B of dependent view $V_1$, and picture 204B of dependent view $V_2$. The access unit at $T_N$ includes picture 202A of base view $V_0$, picture 200A of dependent view $V_1$, and picture 204A of dependent view $V_2$. The access unit at $T_0$ may be an anchor access unit or random access unit, and the texture pictures 200B, 202B and 204B of the access unit at $T_0$ may be referred to as anchor pictures or random access picture. Texture pictures 200A, 202A and 204A of the access unit at $T_N$ may be referred to as non-anchor pictures or non-random access pictures, and the access unit at $T_N$ may be referred to as a non-anchor access unit or non-random access unit.

In the example of FIG. 5, each of the texture pictures is associated with one estimated depth map. For example, picture 202B of base view $V_0$ at $T_0$ is associated with base depth map estimate 302B, picture 200B of dependent view $V_1$ at $T_0$ is associated with dependent depth map estimate 300B, and picture 204B of dependent view $V_2$ at $T_0$ is associated with dependent depth map estimate 304B. Similarly, picture 202A of base view $V_0$ at $T_N$ is associated with base depth map estimate 302A, picture 200A of dependent view $V_1$ at $T_N$ is associated with dependent depth map estimate 300A, and picture 204A of dependent view $V_2$ at $T_N$ is associated with dependent depth map estimate 304A.

In random access units, e.g., according to 3D-HEVC, all blocks of the anchor base view texture picture, e.g., picture 202B, are intra-coded. Typically, most blocks of anchor texture pictures of dependent views, e.g., pictures 200B and 204B, are coded using DCP, and the remaining blocks are intra-coded. Accordingly, as illustrated in FIG. 5, a video coder, e.g., video encoder 20 or video decoder 30, uses DCP to code at least some of the blocks of anchor picture 200B of dependent view $V_1$ relative to blocks of anchor picture 202B of base view $V_0$ (402), and uses DCP to code at least some of the blocks of anchor picture 204B of dependent view $V_2$ relative to blocks of anchor picture 202B of base view $V_0$ (404).

When coding anchor picture 200B in dependent view $V_1$, it is either intra-coded or inter-coded with DCP with inter-view motion prediction and inter-view residual prediction disabled, since there is no depth information, e.g., dependent depth map estimate 300B, yet available. After coding anchor picture 200B in dependent view $V_1$, the video coder may convert the coded disparity vectors used for DCP to depth values, e.g., by setting all depth samples of a block in dependent depth map estimate 300B corresponding to the disparity-compensated block of texture picture 200B equal to the derived depth value (406). That is, the video coder may calculate depth values from the corresponding disparity vectors to generate blocks of depth map estimate 300B. Typically, relatively small disparity vectors correspond to objects displayed at the same depth as the screen (sometimes referred as the plane of convergence), whereas relatively large disparity vectors correspond to objects displayed at positions relatively far from the screen (e.g., far in front of or far behind the screen, or plane of convergence). In this manner, the video coder may generate or update dependent depth map estimate 300B based on the coded motion information for anchor picture 200B in $V_1$.

According to the current 3D-HEVC implementation, a video coder may utilize depth map estimate 300B for coding the following texture pictures in dependent view $V_1$, e.g., non-anchor texture picture 300A, and coding texture pictures in $V_2$, e.g., texture pictures 204B and 204A. For example, the video coder may warp dependent depth map estimate 300B to the base view $V_0$ to produce base depth map estimate 302B (408), and then warp based depth map estimate 302B to dependent view $V_2$ to produce dependent depth map estimate 304B (410). The warping of the single, common base depth map estimate 302B to the second dependent view $V_2$ to produce dependent depth map estimate 304B (410) is illustrated with a dashed arrow in FIG. 5 to indicate that such warping of a common base depth map estimate to a additional dependent views is not performed according to the techniques of this disclosure.

Warping of a depth map estimate may include modifying the depth values of the depth map estimate, e.g., by application of a transform, based on camera parameters or other information indicating the spatial relationships between the views. Warping may additionally include known techniques, such as application of a hole-filling algorithm. Example techniques for warping are described in w12559, referenced herein, e.g., within section 3.2.1 of w12559.

In one example, a 3D warping process involves projecting points from a first view into the image plane of a second view. For this, the intrinsic camera parameters A, and extrinsic camera parameters E=[R|t] are required. The intrinsic matrix A, transforms the 3D camera coordinates to its 2D image coordinates. The extrinsic matrix E=[R|t] transforms the world coordinates to camera coordinates, which is composed of rotation matrix R and translation vector t. The two-step warping can be formulated in two equations, such as equations (1) and (3) below.

First a pixel $(u_r, v_r)$ in the first view is warped to the world coordinates $(X_e, Y_w, Z_w)$, using the depth of the first view:

$$\begin{pmatrix} X_w \\ Y_w \\ Z_w \end{pmatrix} = R_{3\times3,r}^{-1}\left(z_r A_{3\times3,r}^{-1}\begin{pmatrix} u_r \\ v_r \\ 1 \end{pmatrix} - t_{3\times1,r}\right) \quad (1)$$

where subscript r indicates the first view and $z_r$ is the depth value in the first view at location $(u_r, v_r)$ calculated from $$z = \frac{1}{\frac{v}{255} \cdot \left(\frac{1}{Z_{near}} - \frac{1}{Z_{far}}\right) + \frac{1}{Z_{far}}} \quad (2)$$

where v is an 8-bit intensity of the depth map value.

It is noted that the values z, $Z_{near}$, and $Z_{far}$ are assumed to be either all positive or all negative values.

Then the 3D point is mapped to the second view:

$$z_v\begin{pmatrix} u_v \\ v_v \\ 1 \end{pmatrix} = A_{3\times3,v}\left(R_{3\times3,v}\begin{pmatrix} X_w \\ Y_w \\ Z_w \end{pmatrix} + t_{3\times1,v}\right) \quad (3)$$

where subscript v refers to the virtual view.

If multiple pixels warp to the same location in the second view, then the pixel closest to the camera wins, so foreground pixels will occlude background pixels.

The video coder may code the anchor texture picture 204B of dependent view $V_2$ relative to anchor texture picture 202B of base view $V_0$ using inter-view motion prediction and/or inter-view residual prediction, as well as dependent depth map estimate 304B, e.g., as described above with respect to FIG. 4 (412). The coding of dependent texture picture 204B relative to base texture picture 202B, e.g., using inter-view motion prediction and/or inter-view residual prediction with dependent depth map estimate 304B is illustrated with a dashed arrow in FIG. 5 to indicate that such inter-view motion prediction and/or inter-view residual prediction of an anchor picture in a dependent view is not performed according to example techniques of this disclosure. In some examples according to the techniques of this disclosure, inter-view motion prediction and inter-view residual prediction are disabled for coding anchor pictures in dependent views, and enabled for coding non-anchor pictures in dependent views.

After anchor texture picture 204B in dependent view $V_2$ is fully coded, the video coder may use the coded motion information to update dependent depth map estimate 304B (414). The video coder may update dependent depth map estimate 304B on a block-by-block basis according to the prediction type used to code the spatially-corresponding blocks of texture picture 204B. For example, for blocks of texture picture 204B that were coded using DCP, the video coder may obtain the depth map samples by converting the disparity vector for DCP into a depth value. In summary, as described above, the current 3D-HEVC depth map estimation process for anchor pictures in the case of three views, illustrated in FIG. 5, requires that depth map estimates be updated twice (406, 414), and warped twice (408, 410). Although not illustrated in FIG. 5, in examples in which the video data includes additional dependent views, a video coder may warp dependent depth map estimate 304B back to the base view $V_0$ to update base depth map estimate 302B, and then warp base depth map estimate 302B to the next dependent view to produce another dependent depth map estimate for use in inter-view motion prediction and/or inter-view residual prediction of the anchor texture picture of the additional dependent view.

The access unit at time $T_N$ includes non-anchor texture pictures 200A, 202A and 204A, which may be, although are not necessarily, the first non-anchor pictures in each view. The first non-anchor pictures may not be in an access unit adjacent to $T_0$, and may instead be, for example, in an access unit at $T_{16}$. A video coder, e.g., video encoder 20 or video decoder 30, may code, e.g., encode or decode, blocks of non-anchor texture picture 202A of base view $V_0$ using intra-prediction or temporal inter-prediction, e.g., MCP. The video coder may then update base depth map estimate 302B to produce base depth map estimate 302A based on the coding of texture picture 202A of base view $V_0$ (416).

For example, for each block of texture picture 202A that is coded using MCP, the video coder may apply the associated motion vector to determine depth values for the spatially-corresponding block of depth map estimate 302A. In particular, the video coder may apply the motion vector to identify a reference block in a previous base depth map estimate, e.g., base depth map estimate 302B, and derive the depth values for the block of depth map estimate 302A based on the depth values in the reference block of the previous base depth map estimate. The motion vectors used for coding texture pictures may be rounded to sample-precision before being used to update depth map estimates. For blocks of texture picture 202A that were intra-coded, the video coder may determine the depth values of spatially-corresponding blocks of base depth map estimate 302A by spatial prediction from neighboring blocks of base depth map estimate 302A, e.g., according to the intra-prediction mode(s) employed to code the spatially-corresponding blocks of texture picture 202A.

The video coder may then warp the updated base depth map estimate 302A associated with the non-anchor texture picture 202A in the base view $V_0$ to dependent view $V_1$ to produce dependent depth map estimate 300A (418). The video coder may then use dependent depth map estimate 300A for inter-view motion prediction and/or inter-view residual prediction coding of texture picture 200A of dependent view $V_1$ relative to texture picture 202A of base view $V_0$, e.g., in the manner described above with respect to FIG. 4 (420). After the coding of texture picture 200A of the dependent view $V_1$, the video coder may update dependent depth map estimate 300A based on the coding of texture picture 200A (422).

The video coder may update dependent depth map estimate 300A on a block-by-block basis according to the prediction type used to code the spatially-corresponding blocks of texture picture 200A. For example, for blocks of texture picture 200B that were coded using DCP, the video coder may obtain the depth map samples by converting the disparity vectors for DCP into a depth values. For each block of texture picture 200A that was coded using MCP, the video coder may apply the associated motion vector to determine depth values for the spatially-corresponding block of depth map estimate 300A. In particular, the video coder may apply the motion vector to identify a reference block in a previous dependent depth map estimate for dependent view $V_1$, e.g., dependent depth map estimate 300B, and derive the depth values for the block of depth map estimate 300A based on the depth values in the reference block of the previous base depth map estimate. The motion vectors used for coding texture pictures may be rounded to sample-precision before being used to update depth map estimates. For blocks of texture picture 200A that were intra-coded, the video coder may determine the depth values of spatially-corresponding blocks of base depth map estimate 300A by spatial prediction from neighboring blocks of base depth map estimate 300A, e.g., according to the intra-prediction mode(s) employed to code the spatially-corresponding blocks of texture picture 200A.

The video coder may then store updated dependent depth map estimate 300A with the reconstructed non-anchor texture picture 200A, as well as warp updated dependent depth map estimate 300A of dependent view $V_1$ to base view $V_0$ to update base depth map estimate 302A of base view $V_0$ (424). The video coder may then warp the updated base depth map estimate 302A of base view $V_0$ to dependent view $V_2$ to produce dependent depth map estimate 304A (426). The video coder may use dependent depth map estimate 304A for inter-view motion prediction and/or inter-view residual prediction coding of non-anchor texture picture 204A of dependent view $V_2$ relative to non-anchor texture picture 202A of base view $V_0$ in the manner described above with respect to FIG. 4 (428). The video coder may then update dependent depth map estimate 304A, e.g., on a block-by-block basis according to the prediction type used to code the spatially-corresponding blocks of texture picture 204A, in the manner described above with respect to dependent depth map estimate 300A and texture picture 200A (430). Although not illustrated in FIG. 5, in examples in which the video data includes additional dependent views, a video coder may warp dependent depth map estimate 304A back to the base view $V_0$ to update base depth map estimate 302A, and then warp base depth map estimate 302A to the next dependent view to produce another dependent depth map estimate for use in inter-view motion prediction and/or inter-view residual prediction of the non-anchor texture picture of the additional dependent view.

For all following non-anchor access units, the example process described with respect to FIG. 5 is repeated. At the next random access unit, inter-view motion parameter prediction and inter-view residual prediction may be disabled for the first dependent view coded, and then enabled after coding the first dependent view and re-initializing the dependent depth map estimate for the first dependent view, e.g., as described above with respect to dependent view $V_1$ and the access unit at $T_0$.

The current design of the depth map estimate derivation process in 3D-HEVC, e.g., as described above with respect to FIG. 5, may present problems. For example, even when two dependent views are supposed to be decoded independently, e.g., by disabling texture prediction from each other, the depth map estimate is designed in a way that one dependent view relies on the other for correct coding. This results in the lack of bitstream extraction functionality for e.g., two stereo operation points sharing the same base view. For example, whenever the depth map information is derived, e.g., after a specific CU is coded with DCP, for instance, in the first non-base view, the information is used to update the base view depth, which may be used to derive the depth information of the other non-base view in a later access unit.

In accordance with examples described in this disclosure, techniques related to depth map estimates in HEVC (as a non-limiting example) based multiview video coding are proposed in this disclosure. The techniques of this disclosure may be applicable to video data including at least one common view, which may be a base view, and N (where N>1) dependent views, each of which depends upon the common view.

In some example techniques described in this disclosure, a dependent view may not depend on any other dependent view. When multiple (N) dependent views are present, for each dependent view of an access unit, one dependent depth map estimate is created for that dependent view and one base depth map estimate is created associated with the base view and corresponding to the specific dependent depth map estimate. A dependent depth map estimate in the dependent view and the one of the plurality of base depth map estimates associated with the dependent view form a depth map estimate pair associated with the dependent view. Each depth map estimate pair is generated and updated independently from any other depth map estimate pair. The generation and updating of the depth map estimates of a depth map estimate pair when multiple dependent views are present in the video data according to this disclosure may be similar to the generation and updating of the depth map estimates according to the current design 3D-HEVC design when only one base view and one dependent view are coded.

According to the techniques of this disclosure, for anchor pictures in dependent views, inter-view motion prediction and inter-view residual prediction may be disabled. After decoding the anchor picture in the i-th dependent view (with i from 1 to N), based on the coded information, the dependent depth map estimate associated with the i-th dependent view is updated. The updated dependent depth map estimate is then warped to the common view to generate the base depth map estimate in the depth map estimate pair.

For non-anchor pictures in the base view, all the base depth map estimate of the N depth map estimate pairs are updated after the decoding the non-anchor pictures in the base view. For non-anchor pictures in dependent views, inter-view motion prediction is enabled. To decode the non-anchor picture in the i-th dependent view, the base depth map estimate of the i-th depth map estimate pair in the same access unit is first warped to the current dependent view to generate the dependent depth map estimate for the i-th dependent view. After decoding the non-anchor picture in the i-th dependent view, the dependent depth map estimate is updated and warped back to the common view to update the associated base depth map estimate. The resolution of the depth map estimates may be the same as the texture picture, or may be different from that of the texture views. In some examples, the resolution of dependent depth map estimates can be different from that of the base depth map estimates.

Figure 6:
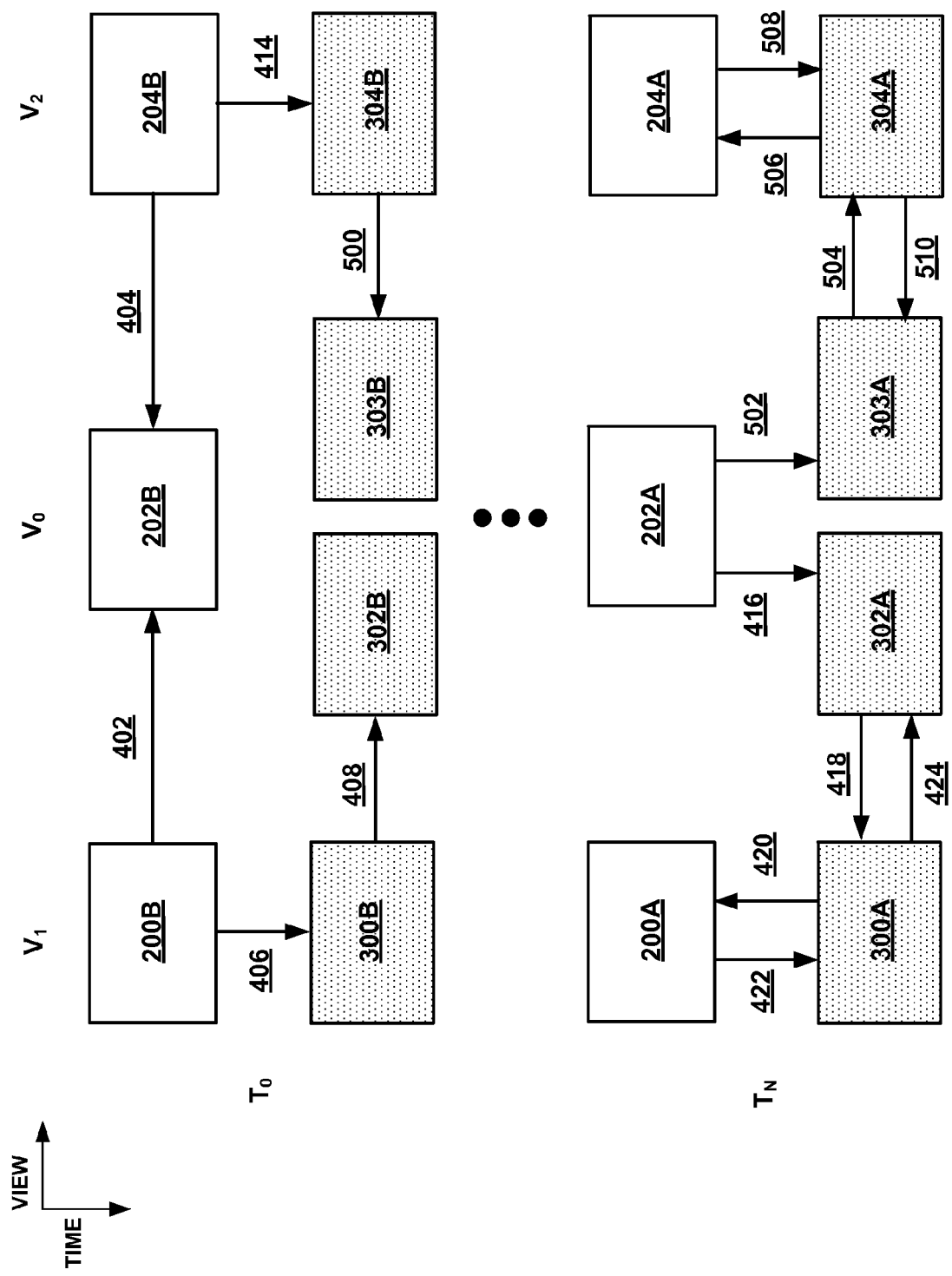
FIG. 6 is a conceptual diagram illustrating an example of generation of depth map estimates for inter-view motion prediction and/or inter-view residual prediction according to the techniques of this disclosure.

FIG. 6 is a conceptual diagram illustrating an example of generation of depth map estimates for inter-view motion prediction and/or inter-view residual prediction according to the techniques of this disclosure. More particularly, FIG. 6 illustrates an example in which, as was the case for the example of FIG. 5, the video data includes three views: a base (reference) view denoted by $V_0$, a first dependent (non-base) view $V_1$ and a second dependent (non-base) view $V_2$. In the example of FIG. 6, as was the case in the example of FIG. 5, the coding order of the three views is: base view $V_0$, dependent view $V_1$, and dependent view $V_2$. Although the example of FIG. 6 includes three views, the techniques of this disclosure may be applied to video data including any number of views, including any number of base and reference views.

Like the example of FIG. 5, FIG. 6 illustrates two access units at two different points in time, denoted $T_0$ and $T_N$, in a video stream, each including a respective texture picture for each of the views. The access unit at $T_0$ includes picture 202B of base view $V_0$, picture 200B of dependent view $V_1$, and picture 204B of dependent view $V_2$. The access unit at $T_N$ includes picture 202A of base view $V_0$, picture 200A of dependent view $V_1$, and picture 204A of dependent view $V_2$. The access unit at $T_0$ may be a random access unit, and the texture pictures 200B, 202B and 204B of the random access unit may be referred to as anchor pictures. Texture pictures 200A, 202A and 204A of the access unit at $T_0$ may be referred to as non-anchor pictures.

In the example of FIG. 6, like the example of FIG. 5, each of the texture pictures of the dependent view is associated with one depth map estimate. However, unlike the example of FIG. 5, in the example of FIG. 6 there are respective base depth view estimates for each of the dependent views. Accordingly, picture 202B of base view $V_0$ at $T_0$ is associated with a base depth map estimate 302B that is derived from base depth map estimate 300B of dependent view $V_1$, and a base depth map estimate 303B that is derived from base depth map estimate 304B of dependent view $V_2$. Similarly, picture 202A of base view $V_0$ at $T_N$ is associated with a base depth map estimate 302A that is paired with base depth map estimate 300A of dependent view $V_1$, and a base depth map estimate 303A that is paired base depth map estimate 304A of dependent view $V_2$. In the example of FIG. 6, a video coder generates and updates a depth map estimate pair, including a base depth map estimate and a dependent depth map estimate, for each dependent view.

As an example of coding anchor texture pictures according to the techniques of this disclosure, as was the case in the example of FIG. 5, a video coder intra-prediction codes, e.g., video encoder 20 encodes or video decoder 30 decodes, the blocks of anchor texture picture 202B of base view $V_0$ in the example of FIG. 6. The video coder may code blocks of anchor texture pictures 200B and 204B of dependent views $V_1$ and $V_2$ relative to picture 202B of the base view using DCP (402, 404), or may intra-code some of the blocks. Unlike the current HEVC implementation, inter-view motion prediction and/or inter-view residual prediction are disabled for coding the anchor texture pictures of all of the dependent views, e.g., both of anchor texture pictures 200B and 204B of dependent views $V_1$ and $V_2$.

After coding anchor picture 200B in dependent view $V_1$, the video coder may convert the coded disparity vectors used for DCP to depth values, e.g., by setting all depth samples of a block in dependent depth map estimate 300B corresponding to the disparity-compensated block of texture picture 200B equal to the derived depth value (406), and warp dependent depth map estimate 300B to the base view $V_0$ to produce base depth map estimate 302B (408), as was the case in the example of FIG. 5. However, the video coder does not then warp base depth map estimate 302B to dependent view $V_2$ to produce dependent depth map estimate 304B (410 of FIG. 5).

Rather, the video coder generates dependent depth map estimate 304B of dependent view $V_2$ based on the disparity information used to DCP code texture picture 204B (414), e.g., in the manner that was done for dependent depth map 300B of dependent view $V_1$ based on the coding of texture picture 200B. The video coder may then warp dependent depth map estimate 300B to the base view $V_0$ to produce base depth map estimate 303B (500). Thus, according to the techniques of this disclosure, the video coder may generate depth map estimate pairs for each dependent view, and avoid coding dependencies between the dependent views. Base depth map estimates 302B and 303B associated with anchor picture 202B may be used to update corresponding base depth map estimates associated with non-anchor texture pictures in the base view.

As an example of coding anchor texture pictures according to the techniques of this disclosure, as was the case in the example of FIG. 5, a video coder intra-prediction or MCP codes non-anchor texture picture 202 of base view $V_0$. The video coder may then update base depth map estimates 302B and 303B to produce base depth map estimates 302A and 303A based on the coding of texture picture 202A of base view $V_0$ (416, 502). For example, for each block of texture picture 202A that is coded using MCP, the video coder may apply the associated motion vector to determine depth values for the spatially-corresponding block in each of depth map estimates 302A and 303A. In particular, the video coder may apply the motion vector to identify a reference block in a previous base depth map estimate, e.g., base depth map estimate 302B, and derive the depth values for the block of depth map estimates 302A and 303A based on the depth values in the reference block of the previous base depth map estimate. The motion vectors used for coding texture pictures may be rounded to sample-precision before being used to update depth map estimates. For blocks of texture picture 202A that were intra-coded, the video coder may determine the depth values of spatially-corresponding blocks of base depth map estimate 302A by spatial prediction from neighboring blocks of base depth map estimate 302A, e.g., according to the intra-prediction mode(s) employed to code the spatially-corresponding blocks of texture picture 202A. The video coder may then warp base depth map estimate 302A to dependent view $V_1$ to produce dependent depth map estimate 300A (418), and warp base depth map estimate 303A to dependent view $V_2$ to produce dependent depth map estimate 304A (504). According to the techniques of this disclosure, the generation of dependent depth map estimate 304A for the second dependent view $V_2$ does not depend on depth map estimate 300A, or the coding of texture picture 200A, of the first dependent view $V_1$. In this manner, the techniques of this disclosure may avoid dependencies between dependent views.

According to the techniques of this disclosure, inter-view motion prediction and/or inter-view residual prediction may be enabled for coding non-anchor texture pictures of dependent views. Accordingly, in the example of FIG. 6, the video coder may use dependent depth map estimate 300A for inter-view motion prediction and/or inter-view residual prediction coding of texture picture 200A of dependent view $V_1$ relative to texture picture 202A of base view $V_0$ (420). The video coder may similarly use dependent depth map estimate 304A for inter-view motion prediction and/or inter-view residual prediction coding of texture picture 204A of dependent view $V_2$ relative to texture picture 202A of base view $V_0$ (506). When the dependent view texture pictures are coded, the video coder may update dependent depth map estimates 300A and 304A based on the coding of the dependent view texture pictures (422, 508).

The video coder may update dependent depth map estimates 300A and 304A on a block-by-block basis according to the prediction type used to code the spatially-corresponding blocks of texture pictures 200A and 204A. For example, for blocks of the dependent texture pictures that were coded using DCP, the video coder may obtain the depth map samples by converting the disparity vectors for DCP into a depth values. For each block of the texture pictures that was coded using MCP, the video coder may apply the associated motion vector to determine depth values for the spatially-corresponding blocks of the depth map estimates. In particular, the video coder may apply the motion vector to identify a reference block in a previous dependent depth map estimate for the dependent view, and derive the depth values for the block of the depth map estimate for the dependent view based on the depth values in the reference block of the previous base depth map estimate for the dependent view. The motion vectors used for coding texture pictures may be rounded to sample-precision before being used to update depth map estimates. For blocks of the dependent view texture pictures 200A and 204A that were intra-coded, the video coder may determine the depth values of spatially-corresponding blocks of base depth map estimates 300A and 304A by spatial prediction from neighboring blocks of base depth map estimates 300A and 304A, e.g., according to the intra-prediction mode (s) employed to code the spatially-corresponding blocks of the texture pictures.

The video coder may then store updated dependent depth map estimates 300A and 304A with the reconstructed non-anchor texture pictures 200A and 204A. The video coder may also warp updated dependent depth map estimate 300A of dependent view $V_1$ to base view $V_0$ to update base depth map estimate 302A of base view $V_0$ (424), and warp updated dependent depth map estimate 304A of dependent view $V_2$ to base view $V_0$ to update base depth map estimate 303A of base view $V_0$ (510). Consequently, according to the techniques of this disclosure, the video coder independently updates the base depth map estimates of each depth map estimate pair based on the respective dependent depth map estimate.

For all following access points, the techniques illustrated by the example of FIG. 6 may be repeated. After coding the base view texture picture, N base depth map estimates for the base view picture are determined by MCP using the transmitted motion parameters. The i-th base depth map estimate is warped to $V_i$ and used for the inter-view motion prediction and/or inter-view residual prediction. After decoding the picture of $V_i$, the depth map estimate is updated using the actually used coding parameters, and warped back to the base view. At the next random access unit, inter-view motion parameter prediction and/or inter-view residual prediction for dependent views may be disabled, and after decoding the i-th non-base view of the random access unit, the depth map is re-initialized as described above.

Figure 7:
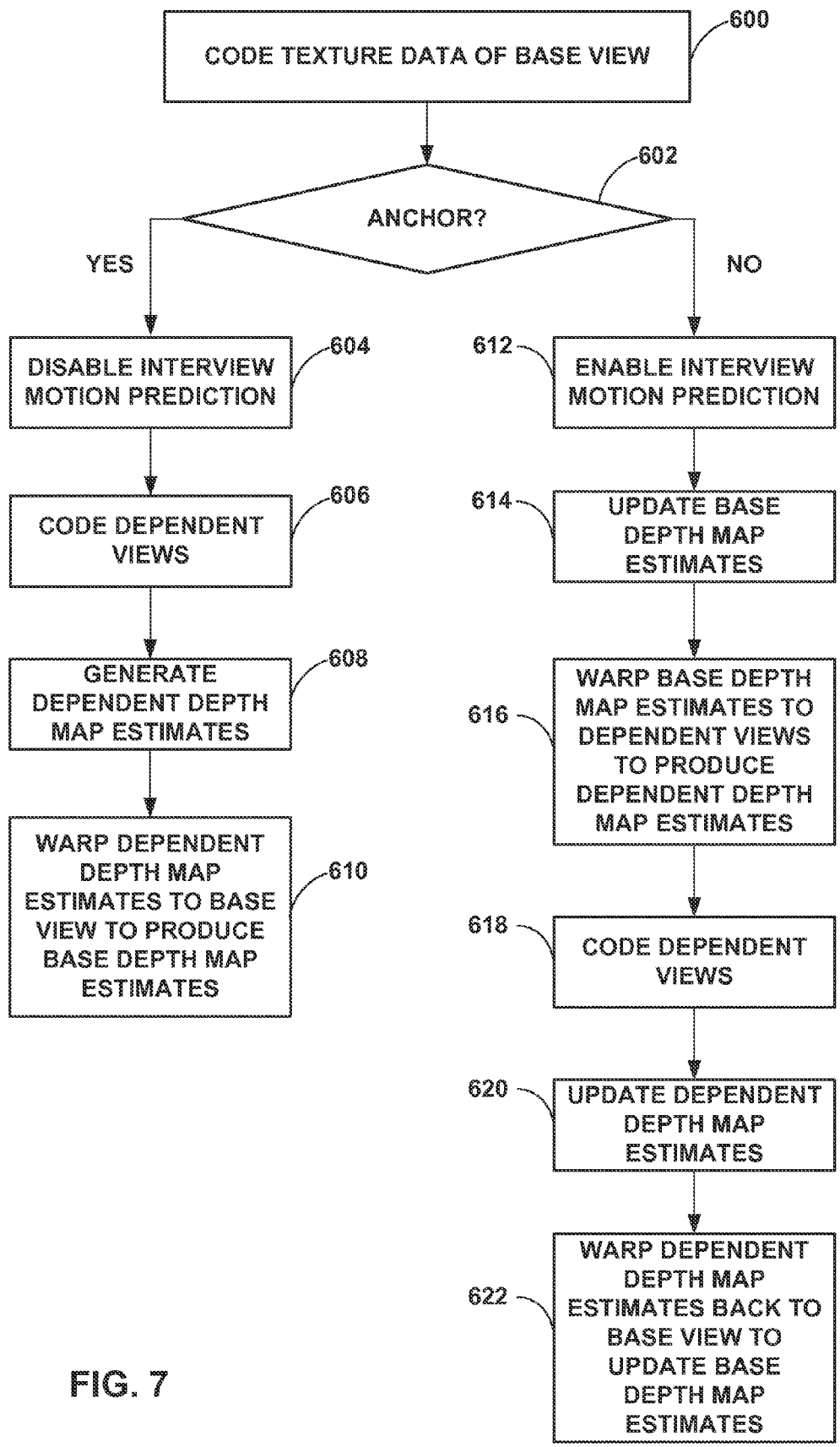
FIG. 7 is a flowchart illustrating an example technique for generation of depth map estimates according to this disclosure.

FIG. 7 is a flowchart illustrating an example technique for generation of depth map estimates according to this disclosure. The example technique of FIG. 7 may be employed by a video coder, which may be a video encoder, such as video encoder 20, or a video decoder, such as video decoder 30.

According to the example technique of FIG. 7, a video coder codes, e.g., encodes or decodes, data for a picture in the base view (600). The video coder may determine whether the picture is an anchor picture or a non-anchor picture (602). If the picture is an anchor picture, the video coder may disable inter-view motion prediction and/or inter-view residual prediction of the dependent-view anchor pictures (604). The video coder may then code the anchor texture pictures of the dependent views, e.g., using DCP (606). That is, the video coder may disable prediction of motion and/or residual information for the dependent-view anchor pictures, but may still use inter-view prediction (also referred to herein as DCP) to predict the dependent-view anchor pictures. The video coder may also generate dependent depth map estimates for each of the dependent views based on the coding, e.g., by converting disparity vectors used for DCP to depth values (608). The video coder may then warp each of the dependent depth map estimates to the base view to produce a respective one of a plurality of based depth map estimates (610). The dependent depth map estimates and respective base depth map estimates may be considered depth map estimate pairs associated with the respective dependent views.

For non-anchor pictures (NO of 602), the video coder may enable inter-view motion prediction and/or inter-view residual prediction of non-anchor pictures in the base view (612). To derive the dependent depth map estimates for inter-view motion prediction and/or inter-view residual prediction of the dependent view pictures, the video coder may update the base depth map estimates based on the coding of the non-anchor texture picture of the base view (614). For example, the video coder may apply the prediction information used to code the texture picture to the base depth map estimates to update the base depth map estimates. The video coder may then warp each of the base depth map estimates to the respective dependent views to produce respective dependent depth map estimates for each of the dependent views (616).

The video coder may then code the non-anchor texture pictures in the dependent views (618). Because inter-view motion prediction and/or inter-view residual prediction is enabled for non-anchor pictures in the dependent views according to the techniques described in this disclosure, the coding may include inter-view motion prediction and/or inter-view residual prediction of blocks of the dependent view texture pictures relative blocks of the non-anchor texture picture base view. Based on the prediction parameters used to code the texture pictures in the dependent views, the video coder may update the respective dependent depth map estimates (620). The video coder may then warp the dependent depth map estimates back to the base view to update the respective ones of the plurality of base depth map estimates (622).

Figure 8:
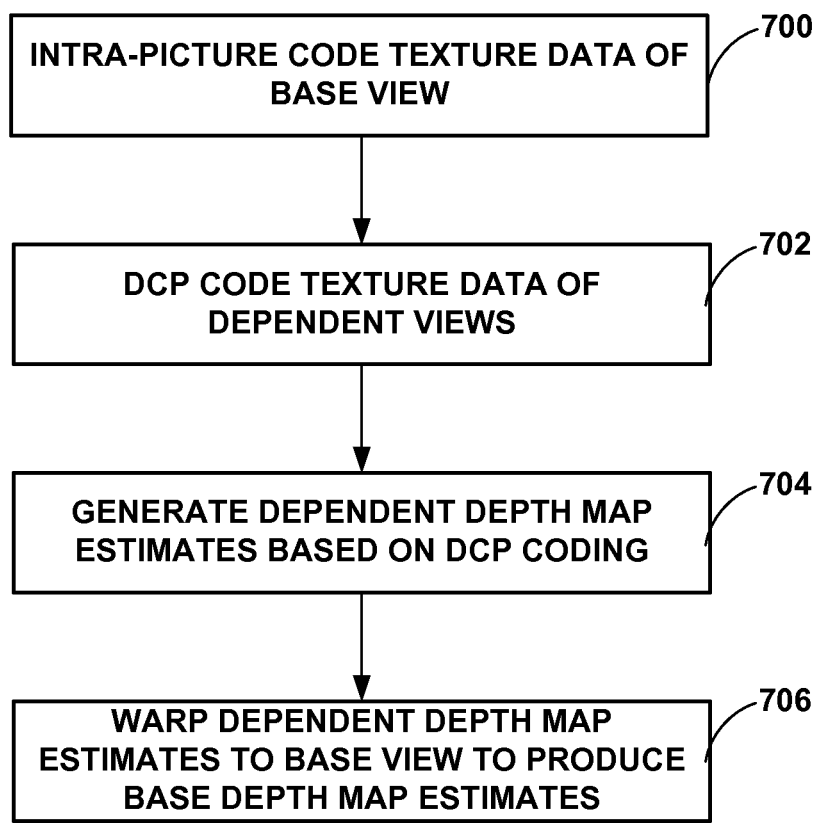
FIG. 8 is a flowchart illustrating an example technique for coding texture data and generating depth map estimates for anchor pictures according to this disclosure.

FIG. 8 is a flowchart illustrating an example technique coding texture data and generating depth map estimates for anchor pictures according to this disclosure. The example technique of FIG. 8 may be employed by a video coder, which may be a video encoder, such as video encoder 20, or a video decoder, such as video decoder 30.

According to the example of FIG. 8, the video coder may intra-picture code texture data, e.g., a texture picture, of the base view (700). The video coder may then DCP code blocks texture data of the dependent views with reference to blocks of texture data in the base view (702). The video coder may generate a respective one of a plurality of dependent depth map estimates for each of the dependent views based on the coding of the texture data of the dependent views (704). For example, the video coder may derive depth values for the dependent depth map estimates based on disparity vectors used to code the texture data of the dependent views. The video coder may then warp each of the dependent depth map estimates to the base view to produce a respective one of a plurality of base depth map estimates (706).

Figure 9:
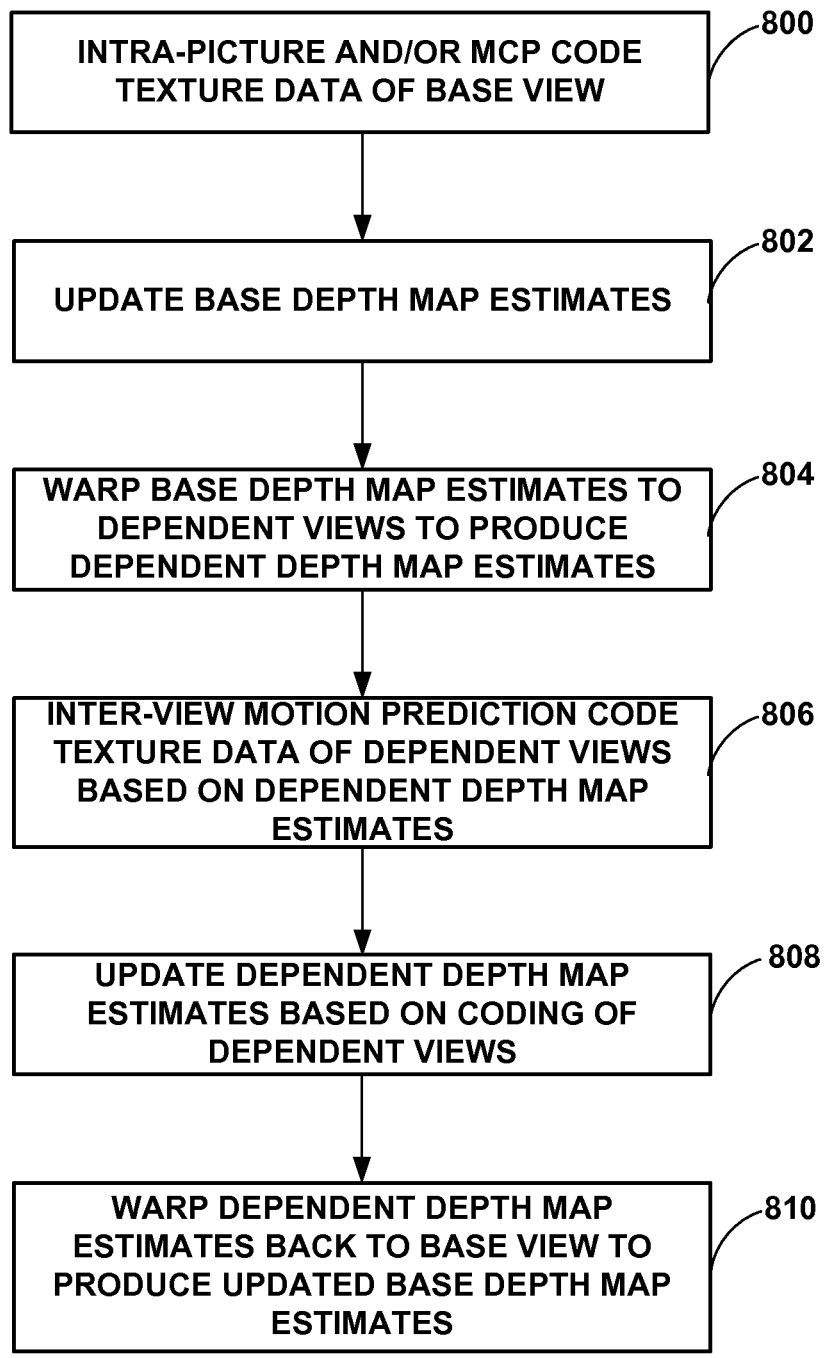
FIG. 9 is a flowchart illustrating an example technique for coding texture data and generating depth map estimates for non-anchor pictures according to this disclosure.

FIG. 9 is a flowchart illustrating an example technique coding texture data and generating depth map estimates for non-anchor pictures according to this disclosure. The example technique of FIG. 9 may be employed by a video coder, which may be a video encoder, such as video encoder 20, or a video decoder, such as video decoder 30.

According to the example of FIG. 9, the video coder may apply intra-picture or MCP coding to code the blocks of texture data, e.g., of the non-anchor picture, of the base view (800). As described herein, the video coder may update each of the plurality base depth map estimates based on the prediction parameters used to code the texture data of the base view (802). The video coder may then warp the base depth map estimates to their respective dependent views to produce dependent depth map estimates for the dependent views (804).

The video coder may then apply inter-view motion prediction and/or inter-view residual prediction to code texture data, e.g., of non-anchor pictures, of the dependent views relative to texture data of the base view based on their respective dependent depth map estimates (806). The video coder may then update the dependent depth map estimates based on the prediction parameters used to code the texture data of the dependent views using the techniques described herein, e.g., with respect to FIG. 6 (808). The video coder may then warp each of the dependent depth map estimates back to the base view to produce a respective one of a plurality of updated base depth map estimates (810).

The techniques for generating and updating depth map estimates for inter-view motion prediction and/or inter-view residual prediction coding described herein may be performed by a video coder, such as video encoder 20 or video decoder 30. Both an encoder and a decoder may generate depth map estimates as part of reciprocal encoding and decoding processes. For example, both an encoder and decoder may utilize inter-view motion prediction, which may include identification of an IVMP candidate for a motion vector predictor candidate list. Both the encoder and decoder may identify the IVMP candidate and generate the candidate list in the same manner. The encoder may signal the selected candidate from the list via an index into the list.

Figure 10:
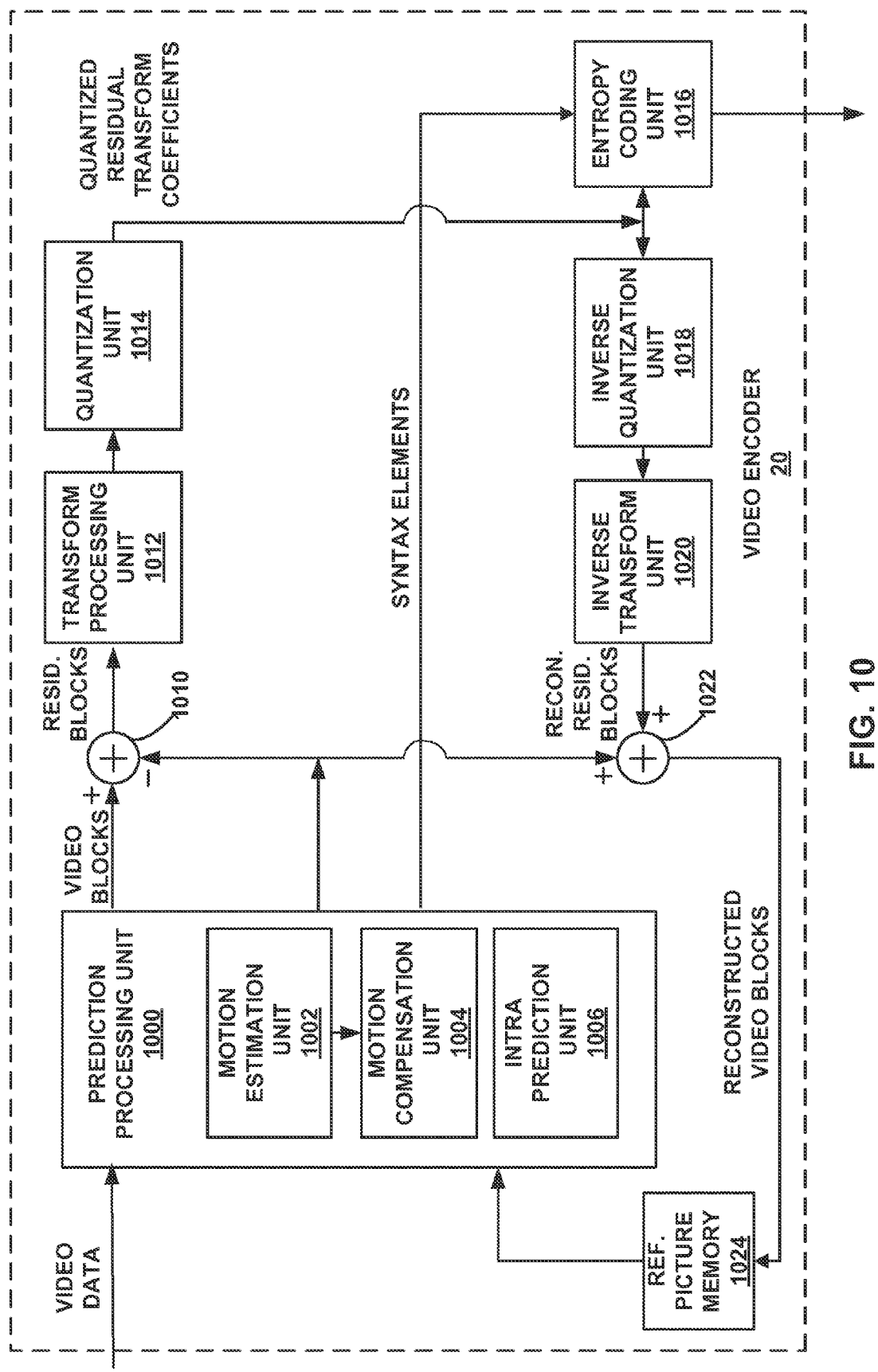
FIG. 10 is a block diagram illustrating an example of a video encoder that may implement the techniques described in this disclosure for generating depth map estimates for inter-view motion prediction and/or inter-view residual prediction in multiview video coding.

FIG. 10 is a block diagram illustrating an example of a video encoder 20 that may implement the techniques described in this disclosure for generating and updating depth map estimates for inter-view motion prediction and/or inter-view residual prediction coding. Video encoder 20 may be configured to perform any or all of the techniques of this disclosure, e.g., perform any of the example techniques illustrated in FIGS. 6-9.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 10, video encoder 20 receives video data. In the example of FIG. 10, video encoder 20 a prediction processing unit 1000, a summer 1010, a transform processing unit 1012, a quantization unit 1014, an entropy encoding unit 1016, and a reference picture memory 1024. Prediction processing unit 1000 includes a motion estimation unit 1002, motion compensation unit 1004, and an intra-prediction unit 1006.

For video block reconstruction, video encoder 20 also includes inverse quantization unit 1018, inverse transform unit 1020, and a summer 1022. A deblocking filter (not shown in FIG. 10) may also be included to filter block boundaries to remove blockiness artifacts from reconstructed video. If desired, the deblocking filter would typically filter the output of summer 1022. Additional filters (in loop or post loop) may also be used in addition to the deblocking filter. Such filters are not shown for brevity, but if desired, may filter the output of summer 1010 (as an in-loop filter).

During the encoding process, video encoder 20 receives a video picture or slice to be coded. Prediction processing unit 1000 divides the picture or slice into multiple video blocks. Motion estimation unit 1002 and motion compensation unit 1004 perform inter-predictive coding of the received video block relative to one or more blocks in one or more reference pictures stored in reference picture memory 1024 to provide temporal or inter-view prediction. Intra-prediction unit 1006 may alternatively perform intra-predictive coding of the received video block relative to one or more neighboring blocks in the same picture or slice as the block to be coded to provide spatial prediction. Video encoder 20 may perform multiple coding passes, e.g., to select an appropriate coding mode for each block of video data.

Moreover, prediction processing unit 1000 may partition blocks of video data into sub-blocks, based on evaluation of previous partitioning schemes in previous coding passes. For example, prediction processing unit 1000 may initially partition a picture or slice into LCUs, and partition each of the LCUs into sub-CUs according to different prediction modes based on rate-distortion analysis (e.g., rate-distortion optimization). Prediction processing unit 1000 may produce a quadtree data structure indicative of partitioning of an LCU into sub-CUs. Leaf-node CUs of the quadtree may include one or more PUs and one or more TUs.

Prediction processing unit 1000 may select one of the coding modes (intra-coding or inter-coding) e.g., based on error results, and provide the resulting intra-coded or inter-coded block to summer 1010 to generate residual block data and to summer 1022 to reconstruct the encoded block for use as part of a reference picture stored in reference picture memory 1024. Prediction processing unit 1000 also provides syntax elements, such as motion vectors, intra-mode indicators, partition information, reference picture index values, MVP candidate list index values, and other such syntax information, to entropy encoding unit 1016 for use by video decoder 30 in decoding the video blocks, e.g., for inter-view motion prediction as described herein.

Prediction processing unit 1000, e.g., motion estimation unit 1002 and/or motion compensation unit 1004, may perform the techniques described in this disclosure for generating and updating depth map estimates for inter-view motion prediction and/or inter-view residual prediction coding. For example, prediction processing unit 1000, e.g., motion estimation unit 1002 and/or motion compensation unit 1004, may perform any of the example techniques of FIGS. 6-9. Motion estimation unit 1002 and motion compensation unit 1004 may be highly integrated, but are illustrated separately for conceptual purposes.

Motion estimation, performed by motion estimation unit 1002, is the process of generating motion vectors or disparity motion vectors, which estimate motion for video blocks. A motion vector or disparity motion vector may indicate the displacement of a current PU of a current video block within a current picture relative to a predictive block within a reference picture, e.g., a temporal reference picture or an inter-view reference picture. A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 1024.

For example, video encoder 20 may interpolate values of one-quarter pixel positions, one-eighth pixel positions, or other fractional pixel positions of the reference picture. Therefore, motion estimation unit 1002 may perform a motion search relative to the full pixel positions and fractional pixel positions and output a motion vector with fractional pixel precision. Motion estimation unit 1002 may select the reference picture from a reference picture list, e.g., List 0 or List 1, which identifies one or more reference pictures stored in reference frame memory 1024. Motion estimation unit 1002 sends the calculated motion vector or disparity motion vector to entropy encoding unit 1016 and motion compensation unit 1004. In some examples described herein, in which AVMP or merge mode is employed, rather than sending the calculated prediction vector to the entropy encoding unit, motion estimation unit 1002 sends an index into a motion vector predictor candidate list and a reference picture index to the entropy encoding unit. A decoder may use the same techniques as encoder 20 to construct the candidate motion vector predictor candidate list, and may select the motion vector predictor, which may be an IVMP for inter-view motion prediction, based on the index signaled by motion estimation unit 1002.

Motion compensation, performed by motion compensation unit 1004, may involve fetching or generating the predictive block based on the prediction vector determined by motion estimation unit 1002. Again, motion estimation unit 1002 and motion compensation unit 1004 may be functionally integrated, in some examples. Upon receiving the prediction vector for the PU of the current video block, motion compensation unit 1004 may locate the predictive block to which the prediction vector points in one of the reference picture lists. Summer 1010 forms a residual video block by subtracting pixel values of the predictive block from the pixel values of the current video block being coded, forming pixel difference values. In general, motion estimation unit 1002 performs motion estimation relative to luma components, and motion compensation unit 1004 uses prediction vectors calculated based on the luma components for both chroma components and luma components.

Intra-prediction unit 1006 may intra-predict a current block, as an alternative to the inter-prediction performed by motion estimation unit 1002 and motion compensation unit 1004. In particular, intra-prediction unit 1006 may determine an intra-prediction mode to use to encode a current block. In some examples, intra-prediction unit 1006 may encode a current block using various intra-prediction modes, e.g., during separate encoding passes, and intra-prediction unit 1006 may select an appropriate intra-prediction mode to use from the tested modes.

For example, intra-prediction unit 1006 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 1006 may calculate ratios from the distortions and rates for the various encoded blocks to determine which intra-prediction mode exhibits the best rate-distortion value for the block.

After selecting an intra-prediction mode for a block, intra-prediction unit 1006 may provide information indicative of the selected intra-prediction mode for the block to entropy encoding unit 1016. Entropy encoding unit 1016 may encode the information indicating the selected intra-prediction mode for use by video decoder 30 in decoding the video block. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from prediction module 1001 from the original video block being coded. Summer 1010 represents the component or components that perform this subtraction operation. Transform processing unit 1012 applies a transform, such as a discrete cosine transform (DCT) or a conceptually similar transform, to the residual block, producing a video block comprising residual transform coefficient values. Transform processing unit 1012 may perform other transforms which are conceptually similar to DCT. Wavelet transforms, integer transforms, sub-band transforms or other types of transforms could also be used. In any case, transform processing unit 1012 applies the transform to the residual block, producing a block of residual transform coefficients. The transform may convert the residual information from a pixel value domain to a transform domain, such as a frequency domain. Transform processing unit 1012 may send the resulting transform coefficients to quantization unit 1014.

Quantization unit 1014 quantizes the values of the transform coefficients to further reduce bit rate. The quantization process may reduce the bit depth associated with some or all of the coefficients. The degree of quantization may be modified by adjusting a quantization parameter. In some examples, quantization unit 1014 may then perform a scan of the matrix including the quantized transform coefficients. Alternatively, entropy encoding unit 1016 may perform the scan.

Following quantization, entropy encoding unit 1016 entropy codes the quantized transform coefficients. For example, entropy encoding unit 1016 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 1016, the encoded bitstream may be transmitted to another device (e.g., video decoder 30) or archived for later transmission or retrieval.

Inverse quantization unit 1018 and inverse transform unit 1020 apply inverse quantization and inverse transformation, respectively, to reconstruct the residual block in the pixel domain and then add the residual to the corresponding predictive block to reconstruct the coded block, e.g., for later use as a reference block. Motion compensation unit 1004 may calculate a reference block by adding the residual block to a predictive block of one of the reference pictures of reference picture memory 1024. Motion compensation unit 1004 may also apply one or more interpolation filters to the reconstructed residual block to calculate sub-integer pixel values for use in motion estimation. Summer 1022 adds the reconstructed residual block to the motion compensated prediction block produced by motion compensation unit 1004 to produce a reconstructed video block for storage in reference picture memory 1024. The reconstructed video block may be used by motion estimation unit 1012 and motion compensation unit 1014 as a reference block to inter-code a block in a subsequent picture, e.g., using the motion vector prediction and inter-view coding techniques described herein.

Figure 11:
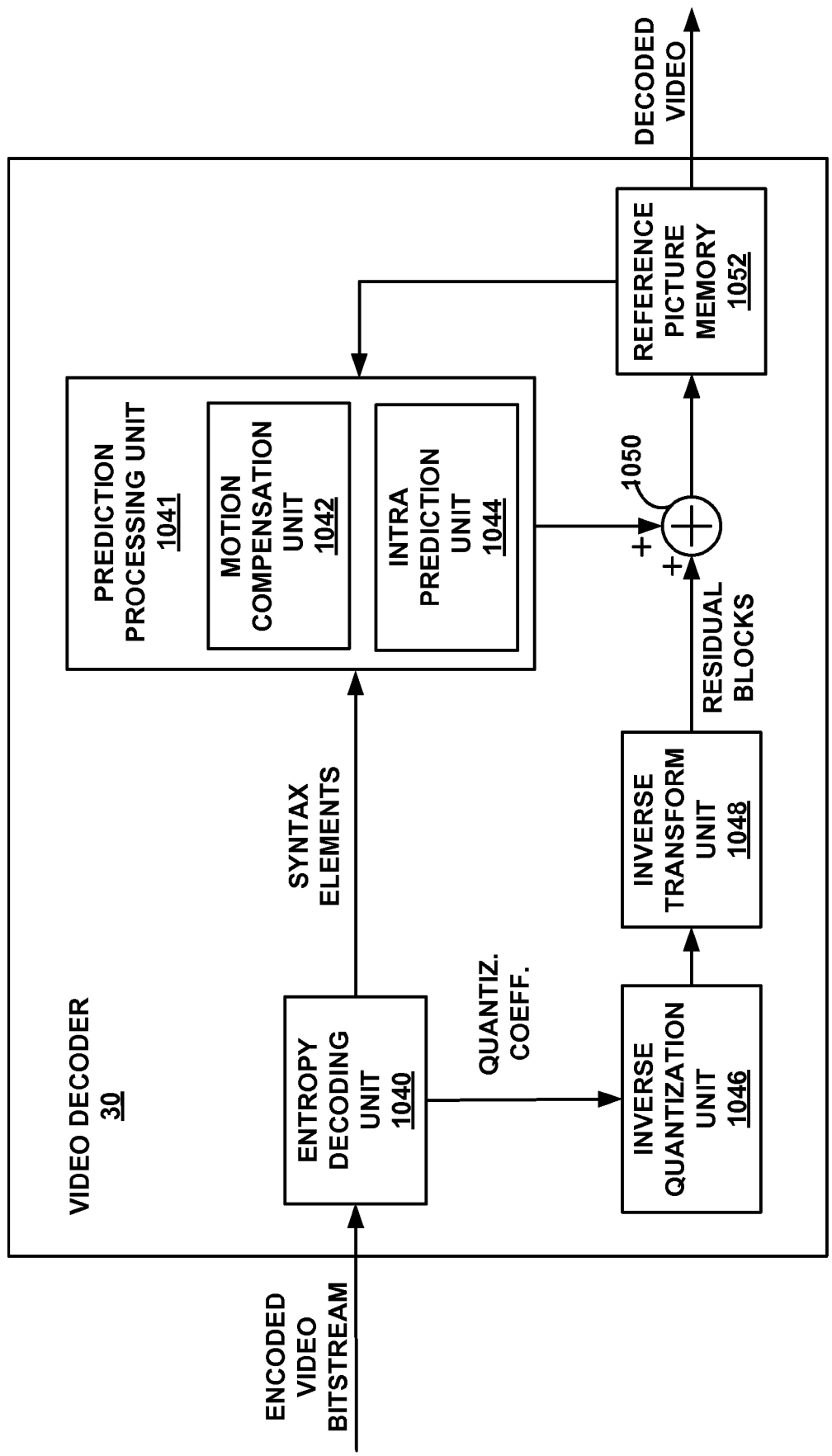
FIG. 11 is a block diagram illustrating an example of a video decoder that may implement the techniques described in this disclosure for generating depth map estimates for inter-view motion prediction and/or inter-view residual prediction in multiview video coding.

FIG. 11 is a block diagram illustrating an example of a video decoder 30 that may implement the techniques described in this disclosure for generating and updating depth map estimates for inter-view motion prediction and/or inter-view residual prediction coding. Video decoder 30 may be configured to perform any or all of the techniques of this disclosure, e.g., perform any of the example techniques illustrated in FIGS. 6-9.

In the example of FIG. 11, video decoder 30 includes an entropy decoding unit 1040, prediction processing unit 1041, inverse quantization unit 1046, inverse transformation unit 1048, reference picture memory 1052 and summer 1050. Prediction processing unit 1041 includes a motion compensation unit 1042 and intra prediction unit 1044. Video decoder 30 may, in some examples, perform a decoding pass generally reciprocal to the encoding pass described with respect to video encoder 20 (FIG. 10). Motion compensation unit 1042 may generate prediction data based on prediction vectors or based on reference picture and motion vector predictor candidate list indices received from entropy decoding unit 1040. Intra-prediction unit 1044 may generate prediction data based on intra-prediction mode indicators received from entropy decoding unit 1040.

During the decoding process, video decoder 30 receives an encoded video bitstream that represents video blocks of an encoded video slice and associated syntax elements from video encoder 20. Entropy decoding unit 1000 of video decoder 30 entropy decodes the bitstream to generate quantized coefficients, prediction vectors, reference picture and motion vector predictor candidate list indices, intra-prediction mode indicators, and other syntax elements, which are forwarded to prediction processing unit 1041. Video decoder 30 may receive the syntax elements at the video slice level and/or the video block level.

When the video slice is coded as an intra-coded (I) slice, intra prediction unit 1044 may generate prediction data for a video block of the current video slice based on a signaled intra prediction mode and data from previously decoded blocks of the current picture. When the video slice is coded as an inter-coded (i.e., B, P or GPB) slice, motion compensation unit 1042 produces reference blocks for a video block of the current video slice based on the prediction vectors, or reference picture and MVP candidate list indices, and other syntax elements received from entropy decoding unit 1040. The reference blocks may be produced from one of the temporal or inter-view reference pictures within reference picture memory 1052. The reference pictures may be listed in one of the reference picture lists, e.g., List 0 and List 1, constructed by video decoder 30 using default construction techniques.

Prediction processing unit 1041, e.g., motion compensation unit 1042, may perform any of the techniques for generating and updating depth map estimates for inter-view motion prediction and/or inter-view residual prediction coding described herein. For example, prediction processing unit 1041, e.g., motion compensation unit 1042, may perform any of the example techniques illustrated by FIGS. 6-9.

Motion compensation unit 1042 may also perform interpolation based on interpolation filters. Motion compensation unit 1042 may use interpolation filters as used by video encoder 20 during encoding of the video blocks to calculate interpolated values for sub-integer pixels of reference blocks. In this case, motion compensation unit 1042 may determine the interpolation filters used by video encoder 20 from the received syntax elements and use the interpolation filters to produce predictive blocks.

Inverse quantization unit 1046 inverse quantizes, i.e., de-quantizes, the quantized transform coefficients provided in the bitstream and decoded by entropy decoding unit 1040. The inverse quantization process may include use of a quantization parameter $QP_Y$ calculated by video decoder 30 for each video block in the video slice to determine a degree of quantization and, likewise, a degree of inverse quantization that should be applied. Inverse transform unit 1048 applies an inverse transform, e.g., an inverse DCT, an inverse integer transform, or a conceptually similar inverse transform process, to the transform coefficients in order to produce residual blocks in the pixel domain.

After motion compensation unit 1042 generates the predictive block for the current video block, video decoder 30 forms a decoded video block by summing the residual blocks from inverse transform unit 1048 with the corresponding predictive blocks generated by motion compensation unit 1042. Summer 1050 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given picture are then stored in reference picture memory 1052, which stores reference pictures used for subsequent motion compensation. Reference picture memory 1052 may also store the decoded video for later presentation on a display device, such as display device 32 of FIG. 1.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the video data comprising at least one base view and a plurality of dependent views, wherein the plurality of dependent views depend on the base view, the method comprising:
for each of the dependent views, coding texture data for the dependent view for an access unit using disparity motion information for the dependent view relative to texture data for the base view for the access unit;
generating, independent of any other dependent depth map estimate, a respective dependent depth map estimate for each respective dependent view of the plurality of dependent views for the access unit based on the disparity motion information for the respective dependent view; and
warping each of the respective dependent depth map estimates to the base view to produce a respective one of a plurality of base depth map estimates for the access unit, wherein each of the dependent depth map estimates and the respective base depth map estimates form a respective one of a plurality of depth map estimate pairs for the access unit, and wherein each of the plurality of depth map estimate pairs for the access unit is associated with a respective one of the plurality of dependent views.

2. The method of claim 1, wherein each of the depth map estimates comprises a depth map estimate picture (DMEP).

3. The method of claim 1, wherein each of the dependent views is not dependent upon any other of the dependent views.

4. The method of claim 1, wherein the disparity motion information comprises disparity vectors for disparity-compensated prediction (DCP), and generating a dependent depth map estimate comprises converting the disparity vectors to depth values.

5. The method of claim 1, wherein the access unit comprises a first access unit, the method further comprising:
coding texture data of the base view for a second access unit; and
updating each of the plurality of base depth map estimates based on the coding of the texture data of the base view for the second access unit.

6. The method of claim 5,
wherein coding texture data of the base view for the second access unit comprises coding the texture data using at least one of intra-picture prediction or motion compensated prediction (MCP), and
wherein updating each of the plurality of base depth map estimates for the second access unit based on the coding comprises, for each of the base depth map estimates:
for blocks of the base depth map estimate that correspond to blocks of the texture data of the base view for the second access unit that were coded using intra-picture prediction, applying the intra-picture prediction to derive the block of the base depth map estimate from one or more other blocks of the base depth map estimate; and
for blocks of the base depth map estimate that correspond to blocks of the texture data of the base view for the second access unit that were coded using MCP, applying the MCP to derive the block of the base depth map estimate from one or more blocks of a previous version of the base depth map estimate for a previous access unit.

7. The method of claim 5, further comprising, for each of the dependent views:
warping a respective one of the plurality of base depth map estimates to the dependent view to produce a respective dependent depth map estimate; and
coding texture data of the dependent view for the second access unit relative to the texture data for the base view for the second access unit based on the respective dependent depth map estimate.

8. The method of claim 7, wherein coding the texture data of the dependent view for the second access unit relative to the texture data for the base view for the second access unit based on the respective dependent depth map estimate comprises coding the texture data of the dependent view for the second access unit relative to the texture data for the base view for the second access unit with at least one of inter-view motion prediction or inter-view residual prediction enabled.

9. The method of claim 7, further comprising, for each of the dependent views:
updating the respective dependent depth map estimate based on the coded information of the texture data of the dependent view for the second access unit; and
warping the respective dependent depth map estimate back to the base view to update the respective one of the plurality of base depth map estimates.

10. The method of claim 9, wherein coding texture data of the dependent view for the second access unit comprises coding the texture data using at least one of intra-picture prediction, motion compensated prediction (MCP), or disparity compensated prediction (DCP), and
wherein updating the respective dependent depth map estimate comprises:
for blocks of the dependent depth map estimate that correspond to blocks of the texture data of the dependent view for the second access unit that were coded using intra-picture prediction, applying the intra-picture prediction to derive the block of the dependent depth map estimate from one or more other blocks of the dependent depth map estimate;
for blocks of the dependent depth map estimate that correspond to blocks of the texture data of the dependent view for the second access unit that were coded using MCP, applying the MCP to derive the block of the dependent depth map estimate from one or more blocks of a previous version of the dependent depth map estimate for a previous access unit; and
for blocks of the dependent depth map estimate that correspond to blocks of the texture data of the dependent view for the second access unit that were coded using DCP, converting disparity vectors for the DCP into depth values.

11. The method of claim 9, wherein warping the base depth map estimates to the dependent views to produce dependent depth map estimates, coding texture data of the dependent views, updating the dependent depth map estimates, and warping the dependent depth map estimates back to the base view to update the base depth map estimates comprises:
independently, for each of the plurality of dependent views, warping the base depth map estimates to the dependent views to produce dependent depth map estimates, coding texture data of the dependent views, updating the dependent depth map estimates, and warping the dependent depth map estimates back to the base view to update the base depth map estimates.

12. The method of claim 5, wherein first access unit comprises a respective anchor picture for each of the views, and the second access unit comprises a respective non-anchor picture for each of the views.

13. The method of claim 12, wherein the first access unit comprises a random access unit, the anchor pictures comprise random access pictures, the second access unit comprises a non-random access unit, and the non-anchor pictures comprise non-random access pictures.

14. The method of claim 1, wherein:
when the access unit comprises a respective anchor picture for each of the views, coding the texture data of the dependent views comprises disabling at least one of inter-view motion prediction coding or inter-view residual prediction coding of the texture data of the dependent views for the access unit; and
when the access unit comprises a respective non-anchor picture for each of the views, coding the texture data of the dependent views comprises enabling at least one of inter-view motion prediction coding or inter-view residual prediction coding of the texture data of the dependent views for the access unit.

15. The method of claim 1, wherein a resolution of the depth map estimates is the same as a resolution of the texture data.

16. The method of claim 1, wherein a resolution of the depth map estimates is different than a resolution of the texture data.

17. The method of claim 1, wherein a resolution of the dependent depth map estimates is different than a resolution of the base depth map estimates.

18. The method of claim 1, wherein coding texture data comprises decoding texture data with a decoder, and generating and warping the dependent depth map estimates comprises generating and warping the dependent depth map estimates with the decoder.

19. The method of claim 1, wherein coding texture data comprises encoding texture data with an encoder, and generating and warping the dependent depth map estimates comprises generating and warping the dependent depth map estimates with the encoder.

20. A device comprising a video coder for coding video data, the video data comprising at least one base view and a plurality of dependent views, wherein the plurality of dependent views depend on the base view, the video coder comprising:
a memory configured to store at least a portion of the video data; and
one or more processors configured to:
for each of the dependent views, code texture data for the dependent view for an access unit using disparity motion information for the dependent view relative to texture data for the base view for the access unit;
generate, independent of any other dependent depth map estimate, a respective dependent depth map estimate for each respective dependent view of the plurality of dependent views for the access unit based on the disparity motion information for the respective dependent view; and
warp each of the respective dependent depth map estimates to the base view to produce a respective one of a plurality of base depth map estimates for the access unit, wherein each of the dependent depth map estimates and the respective base depth map estimates form a respective one of a plurality of depth map estimate pairs for the access unit, and wherein each of the plurality of depth map estimate pairs for the access unit is associated with a respective one of the plurality of dependent views.

21. The device of claim 20, wherein each of the depth map estimates comprises a depth map estimate picture (DMEP).

22. The device of claim 20, wherein each of the dependent views is not dependent upon any other of the dependent views.

23. The device of claim 20, wherein the disparity motion information comprises disparity vectors for disparity-compensated prediction (DCP), and the one or more processors are configured to convert the disparity vectors to depth values to generate the dependent depth map estimate.

24. The device of claim 20, wherein the access unit comprises a first access unit, and the one or more processors are further configured to:
- code texture data of the base view for a second access unit; and
- update each of the plurality of base depth map estimates based on the coding of the texture data of the base view for the second access unit.

25. The device of claim 24,
wherein the one or more processors are configured to use at least one of intra-picture prediction or motion compensated prediction (MCP) to code the texture data of the base view for the second access unit, and
wherein, for each of the base depth map estimates, the one or more processors are configured to update the base depth map estimate for the second access unit based on the coding by at least being configured to:
- for blocks of the base depth map estimate that correspond to blocks of the texture data of the base view for the second access unit that were coded using intra-picture prediction, apply the intra-picture prediction to derive the block of the base depth map estimate from one or more other blocks of the base depth map estimate; and
- for blocks of the base depth map estimate that correspond to blocks of the texture data of the base view for the second access unit that were coded using MCP, apply the MCP to derive the block of the base depth map estimate from one or more blocks of a previous version of the base depth map estimate for a previous access unit.

26. The device of claim 24, wherein, for each of the dependent views, the one or more processors are further configured to:
- warp a respective one of the plurality of base depth map estimates to the dependent view to produce a respective dependent depth map estimate; and
- code texture data of the dependent view for the second access unit relative to the texture data for the base view for the second access unit based on the respective dependent depth map estimate.

27. The device of claim 26, wherein the one or more processors are configured to code the texture data of the dependent view for the second access unit relative to the texture data for the base view for the second access unit based on the respective dependent depth map estimate with at least one of inter-view motion prediction or inter-view residual prediction enabled.

28. The device of claim 26, wherein, for each of the dependent views, the one or more processors are further configured to:
- update the respective dependent depth map estimate based on the coded information of the texture data of the dependent view for the second access unit; and
- warp the respective dependent depth map estimate back to the base view to update the respective one of the plurality of base depth map estimates.

29. The device of claim 28,
wherein, for each of the dependent views, the one or more processors are configured to use at least one of intra-picture prediction, motion compensated prediction (MCP), or disparity compensated prediction (DCP) for coding the texture data of the dependent view for the second access unit, and
wherein, for each of the dependent depth map estimates, the one or more processors are configured to update the dependent depth map estimate by at least being configured to:
- for blocks of the dependent depth map estimate that correspond to blocks of the texture data of the dependent view for the second access unit that were coded using intra-picture prediction, apply the intra-picture prediction to derive the block of the dependent depth map estimate from one or more other blocks of the dependent depth map estimate;
- for blocks of the dependent depth map estimate that correspond to blocks of the texture data of the dependent view for the second access unit that were coded using MCP, apply the MCP to derive the block of the dependent depth map estimate from one or more blocks of a previous version of the dependent depth map estimate for a previous access unit; and
- for blocks of the dependent depth map estimate that correspond to blocks of the texture data of the dependent view for the second access unit that were coded using DCP, convert disparity vectors for the DCP into depth values.

30. The device of claim 28, wherein the one or more processors are configured to:
independently, for each of the plurality of dependent views, warp the base depth map estimates to the dependent views to produce dependent depth map estimates, code texture data of the dependent views, update the dependent depth map estimates, and warp the dependent depth map estimates back to the base view to update the base depth map estimates.

31. The device of claim 24, wherein first access unit comprises a respective anchor picture for each of the views, and the second access unit comprises a respective non-anchor picture for each of the views.

32. The device of claim 31, wherein the first access unit comprises a random access unit, the anchor pictures comprise random access pictures, the second access unit comprises a non-random access unit, and the non-anchor pictures comprise non-random access pictures.

33. The device of claim 20, wherein the one or more processors are further configured to:
- when the access unit comprises a respective anchor picture for each of the views, disable at least one of inter-view motion prediction coding or inter-view residual prediction coding of the texture data of the dependent views for the access unit; and
- when the access unit comprises a respective non-anchor picture for each of the views, enable at least one of inter-view motion prediction coding or inter-view residual prediction coding of the texture data of the dependent views for the access unit.

34. The device of claim 20, wherein a resolution of the depth map estimates is the same as a resolution of the texture data.

35. The device of claim 20, wherein a resolution of the depth map estimates is different than a resolution of the texture data.

36. The device of claim 20, wherein a resolution of the dependent depth map estimates is different than a resolution of the base depth map estimates.

37. The device of claim 20, wherein the video coder comprises a video decoder, and the one or more processors are configured to decode texture data, and generate and warp the dependent depth map estimates.

38. The device of claim 20, wherein the video coder comprises a video encoder, and the one or more processors are configured to encode texture data, and generate and warp the dependent depth map estimates.

39. The device of claim 20, wherein the device comprises at least one of:
an integrated circuit implementing the video coder;
a microprocessor implementing the video coder; and
a wireless communication device including the video coder.

40. A device for coding video data, the video data comprising at least one base view and a plurality of dependent views, wherein the plurality of dependent views depend on the base view, the device comprising:
means for, for each of the dependent views, coding texture data for the dependent view for an access unit using disparity motion information for the dependent view relative to texture data for the base view for the access unit;
means for generating, independent of any other dependent depth map estimate, a respective dependent depth map estimate for each respective dependent view of the plurality of dependent views for the access unit based on the disparity motion information for the respective dependent view; and
means for warping each of the respective dependent depth map estimates to the base view to produce a respective one of a plurality of base depth map estimates for the access unit, wherein each of the dependent depth map estimates and the respective base depth map estimates form a respective one of a plurality of depth map estimate pairs for the access unit and wherein each of the plurality of depth map estimate pairs for the access unit is associated with a respective one of the plurality of dependent views.

41. The device of claim 40, wherein the access unit comprises a first access unit, the device further comprising:
means for coding texture data of the base view for a second access unit; and
means for updating each of the plurality of base depth map estimates based on the coding of the texture data of the base view for the second access unit.

42. The device of claim 41, further comprising:
means for, for each of the dependent views, warping a respective one of the plurality of base depth map estimates to the dependent view to produce a respective dependent depth map estimate; and
means for, for each of the dependent views, coding texture data of the dependent view for the second access unit relative to the texture data for the base view for the second access unit based on the respective dependent depth map estimate.

43. The device of claim 42, wherein the means for coding texture data of the dependent view for the second access unit relative to the texture data for the base view for the second access unit based on the respective dependent depth map estimate comprises means for coding texture data of the dependent view for the second access unit relative to the texture data for the base view for the second access unit based on the respective dependent depth map estimate with at least one of inter-view motion prediction or inter-view residual prediction enabled.

44. The device of claim 42, further comprising:
means for, for each of the dependent views, updating the respective dependent depth map estimate based on the coded information of the texture data of the dependent view for the second access unit; and
means for, for each of the dependent views, warping the respective dependent depth map estimate back to the base view to update the respective one of the plurality of base depth map estimates.

45. The device of claim 41, wherein first access unit comprises a respective anchor picture for each of the views, and the second access unit comprises a respective non-anchor picture for each of the views.

46. The device of claim 40, further comprising:
means for, when the access unit comprises a respective anchor picture for each of the views, coding the texture data of the dependent views comprises disabling at least one of inter-view motion prediction coding or inter-view residual coding of the texture data of the dependent views for the access unit; and
means for, when the access unit comprises a respective non-anchor picture for each of the views, coding the texture data of the dependent views comprises enabling at least one of inter-view motion prediction coding or inter-view residual coding of the texture data of the dependent views for the access unit.

47. A non-transitory computer-readable storage medium having instructions stored thereon that, when executed by one or more processors of a video coder configured to code video data comprising at least one base view and a plurality of dependent views, wherein the plurality of dependent views depend on the base view, cause the video coder to:
for each of the dependent views, code texture data for the dependent view for an access unit using disparity motion information for the dependent view relative to texture data for the base view for the access unit;
generate, independent of any other dependent depth map estimate, a respective dependent depth map estimate for each respective dependent view of the plurality of dependent views for the access unit based on the disparity motion information for the respective dependent view; and
warp each of the respective dependent depth map estimates to the base view to produce a respective one of a plurality of base depth map estimates for the access unit, wherein each of the dependent depth map estimates and the respective base depth map estimates form a respective one of a plurality of depth map estimate pairs for the access unit, and wherein each of the plurality of depth map estimate pairs for the access unit is associated with a respective one of the plurality of dependent views.

48. The non-transitory computer-readable storage medium of claim 47, wherein the access unit comprises a first access unit, and the instructions further cause the video coder to:
code texture data of the base view for a second access unit; and
update each of the plurality of base depth map estimates based on the coding of the texture data of the base view for the second access unit.

49. The non-transitory computer-readable storage medium of claim 48, wherein the instructions further cause the video coder to, for each of the dependent views:
warp a respective one of the plurality of base depth map estimates to the dependent view to produce a respective dependent depth map estimate; and
code texture data of the dependent view for the second access unit relative to the texture data for the base view for the second access unit based on the respective dependent depth map estimate.

50. The non-transitory computer-readable storage medium of claim 49, wherein the instructions that cause the video coder to code texture data of the dependent view for the second access unit relative to the texture data for the base view for the second access unit based on the respective dependent depth map estimate comprise instructions that cause the video coder to code the texture data of the dependent view for the second access unit relative to the texture data for the base view for the second access unit based on the respective dependent depth map estimate with at least one of inter-view motion prediction or inter-view residual prediction enabled.

51. The non-transitory computer-readable storage medium of claim 49, wherein the instructions further cause the video coder to, for each of the dependent views:
   update the respective dependent depth map estimate based on the coded information of the texture data of the dependent view for the second access unit; and
   warp the respective dependent depth map estimate back to the base view to update the respective one of the plurality of base depth map estimates.

52. The non-transitory computer-readable storage medium of claim 48, wherein first access unit comprises a respective anchor picture for each of the views, and the second access unit comprises a respective non-anchor picture for each of the views.

53. The non-transitory computer-readable storage medium of claim 47, wherein the instructions further cause the video coder to:
   when the access unit comprises a respective anchor picture for each of the views, disable at least one of inter-view motion prediction coding or inter-view residual prediction coding of the texture data of the dependent views for the access unit; and
   when the access unit comprises a respective non-anchor picture for each of the views, enable at least one of inter-view motion prediction coding or inter-view residual prediction coding of the texture data of the dependent views for the access unit.

* * * * *